(12) United States Patent
Matsumoto

(10) Patent No.: US 8,576,433 B2
(45) Date of Patent: Nov. 5, 2013

(54) CHOOSING A PRINTING DEVICE BASED ON ACCUMULATED POWER CONSUMPTION IN A NETWORK

(75) Inventor: Akihiro Matsumoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 330 days.

(21) Appl. No.: 13/154,078

(22) Filed: Jun. 6, 2011

(65) Prior Publication Data
US 2011/0318044 A1    Dec. 29, 2011

(30) Foreign Application Priority Data

Jun. 25, 2010  (JP) .................................. 2010-145526
May 25, 2011  (JP) .................................. 2011-117445

(51) Int. Cl.
*G06F 3/12*    (2006.01)

(52) U.S. Cl.
USPC .............................. 358/1.15; 399/37; 399/88

(58) Field of Classification Search
USPC ...................... 358/1.15; 399/37, 88
See application file for complete search history.

(56) References Cited

U.S. PATENT DOCUMENTS

2010/0166442 A1*  7/2010  Yamada .......................... 399/37

FOREIGN PATENT DOCUMENTS

JP    2000-322161 A    11/2000

* cited by examiner

*Primary Examiner* — Eric A Rust
(74) *Attorney, Agent, or Firm* — Rossi, Kimms & McDowell LLP

(57) ABSTRACT

One aspect of the present invention provides an information processing apparatus comprising: an acquisition unit configured to acquire the print request from the client; a selection unit configured to select the first printing apparatus when the accumulated power consumption is not more than a first threshold, and selects the second printing apparatus when the accumulated power consumption is higher than the first threshold; and an accumulation unit configured to add a power to be consumed by the printing apparatus selected by the selection unit to process the print request to the accumulated power consumption stored in the storage unit.

9 Claims, 24 Drawing Sheets

| POWER SAVING LEVEL \ POWER SHUTDOWN REGION | (A) | (B) | (C) | (D) | (E) | WakeUpTime |
|---|---|---|---|---|---|---|
| PL0 (Standby) | ○ | ○ | ○ | ○ | ○ | 0 |
| PL1 | × | ○ | ○ | ○ | ○ | 3 SEC OR LESS |
| PL2 | × | × | ○ | ○ | ○ | 10 SEC OR LESS |
| PL3 | × | × | × | ○ | ○ | 30 SEC OR LESS |
| PL4 | × | × | × | × | ○ | 10 MIN OR LESS |
| PL5 (POWER OFF) | × | × | × | × | × | 10 MIN OR MORE |

※ ○ : POWER ON   × : POWER SHUTDOWN

FIG. 10A

| POWER STATE | POWER CONSUMPTION |
|---|---|
| PL0 (Standby) | W0 |
| PL1 | W1 |
| PL2 | W2 |
| PL3 | W3 |
| PL4 | W4 |
| PL5 (POWER OFF) | W5 (=0) |
| PL4 → PL0 | W6 |
| PL5 → PL0 | W7 |

FIG. 10C

| PROCESSING CONTENTS | REFERENCE POWER CONSUMPTION |
|---|---|
| Scan to Send | Q1 |
| BOX to Send | Q2 |
| Send to BOX | Q3 |

FIG. 10B

| RESOLUTION(dpi) / PRINT LAYOUT | SINGLE-SIDED | DOUBLE-SIDED | 2-IN-1 SINGLE-SIDED | 2-IN-1 DOUBLE-SIDED | ... |
|---|---|---|---|---|---|
| 300 | P11 | P12 | P13 | P14 | |
| 400 | P21 | P22 | P23 | P24 | |
| 600 | P31 | P32 | P33 | P34 | ... |
| 1200 | P41 | P42 | P43 | P44 | |
| 2400 | P51 | P52 | P53 | P54 | |

FIG. 13

| MONTHLY POWER 1301 | POWER CONSUMPTION 1302 |
|---|---|
| P JANUARY | 1.5P0 |
| P FEBRUARY | P0 |
| P MARCH | P0 |
| P APRIL | P0 |
| P MAY | P0 |
| P JUNE | 1.5P0 |
| P JULY | P0 |
| P AUGUST | P0 |
| P SEPTEMBER | P0 |
| P OCTOBER | 1.5P0 |
| P NOVEMBER | P0 |
| P DECEMBER | 2.0P0 |
| ANNUAL TARGET POWER 1303 | Py |

FIG. 15

| DETERMINATION<br>PRINTING APPARATUS | POWER LEVEL<br>1502 | SPEC LEVEL<br>1503 | Grouping<br>1504 | FINAL SELECTION ORDER<br>1505 |
|---|---|---|---|---|
| PRINTING APPARATUS 1 | 9 | 6 | A | X |
| PRINTING APPARATUS 2 | 6 | 5 | A | X |
| PRINTING APPARATUS 3 | 4 | 3 | A | X |
| PRINTING APPARATUS 4 | 4 | 4 | B | 1 |
| PRINTING APPARATUS 5 | 6 | 3 | B | X |
| PRINTING APPARATUS 6 | 3 | 3 | B | X |
| PRINTING APPARATUS 7 | 5 | 4 | C | X |
| PRINTING APPARATUS 8 | 3 | 3 | C | 2 |

FIG. 16

| SERVICE CONTENTS / POWER THRESHOLD | PM DESIGNATION | | | USER SELECTABLE | | | POWER SAVING LEVEL | | | PRINT CONSTRAINT 1 | PRINT CONSTRAINT 2 | PRINT CONSTRAINT 3 |
|---|---|---|---|---|---|---|---|---|---|---|---|---|
| | 1 | 2 | 3 | 1 | 2 | 3 | 1 | 2 | 3 | | | |
| POWER THRESHOLD 1 | ○ | △ | △ | ○ | ○ | ○ | PL1 | PL2 | PL2 | – | – | – |
| POWER THRESHOLD 2 | ○ | △ | △ | ○ | ○ | ○ | PL1 | PL3 | PL2 | – | – | – |
| POWER THRESHOLD 3 | ○ | △ | △ | ○ | ○ | ○ | PL2 | PL3 | PL3 | – | – | – |
| POWER THRESHOLD 4 | ○ | △ | △ | × | × | ○ | PL3 | PL4 | PL3 | – | – | – |
| POWER THRESHOLD 5 | △ | ○ | △ | × | ○ | ○ | PL4 | PL1 | PL1 | – | – | – |
| POWER THRESHOLD 6 | △ | ○ | △ | × | ○ | ○ | PL4 | PL1 | PL1 | ○ | – | – |
| POWER THRESHOLD 7 | △ | ○ | △ | × | ○ | × | PL4 | PL2 | PL2 | ○ | – | – |
| POWER THRESHOLD 8 | △ | △ | ○ | × | × | ○ | PL4 | PL2 | PL2 | ○ | ○ | – |
| POWER THRESHOLD 9 | △ | △ | ○ | × | × | ○ | PL5 | PL3 | PL3 | ○ | ○ | ○ |
| POWER THRESHOLD 10 | × | × | × | × | × | × | PL5 | PL4 | PL3 | ○ | ○ | ○ |
| POWER THRESHOLD 11 | × | × | × | × | × | × | PL5 | PL4 | PL3 | ○ | ○ | ○ |

CHOOSING A PRINTING DEVICE BASED ON ACCUMULATED POWER CONSUMPTION IN A NETWORK

BACKGROUND OF THE INVENTION

1. Field of the Invention

The present invention relates to a power control apparatus for controlling power for a system including a plurality of printing apparatuses and a method of controlling the same.

2. Description of the Related Art

Many recent printing apparatuses are provided with a reducing power consumption function, which is called an energy saving mode or a sleep mode. For example, a printing apparatus incorporates a timer. When the user access interval to the printing apparatus exceeds a predetermined time, power to the printing apparatus is partially or wholly shut down using the internal timer. Power consumption reduction is thus implemented. Several power saving levels are configured for the energy saving mode. As the power saving level becomes higher, the printing apparatus shifts to an energy saving mode for larger power consumption reduction.

According to the related art, the higher the power saving level is, the longer the time to return to a printable state is. Hence, a general trend indicates that as the energy saving level rises, the convenience (servability) for the user becomes poorer. In a printing system formed by connecting a plurality of printing apparatuses to a network, the printing apparatuses independently receive access generated by the host at random. For this reason, the control mechanism of the energy saving mode cannot effectively function in such a system.

To cope with this problem, Japanese Patent Laid-Open No. 2000-322161 proposes a power control method that defines the relationship between the power load of an entire network and a service capability representing servability as a numerical value. These values are compared to set such a power consumption that implements servability close to the service capability and more than the capability. This power control method makes it possible to reduce power consumption to provide a service more than the currently necessary service capability. At the same time, the necessary servability can be ensured without causing deterioration of the servability.

The power control method of Japanese Patent Laid-Open No. 2000-322161 can control to make power consumption approach the minimum value necessary for implementing the service. However, it is difficult to control the power consumption to a given target power consumption or less. Additionally, control is cumbersome because the load of the entire network needs to be measured periodically.

SUMMARY OF THE INVENTION

In order to solve the above-described problems, the present invention provides a power control apparatus capable of efficiently suppressing power consumption to a target power consumption or less by power control based on the target power consumption in consideration of a changing user service, and a method of controlling the same.

According to one aspect of the invention, an information processing apparatus that includes a storage unit configured to store an accumulated power consumption, within a predetermined period, of a printing apparatus group including a first printing apparatus and a second printing apparatus whose performance and power consumption upon printing are lower than those of the first printing apparatus, and upon receiving a print request from a client, selects a printing apparatus to execute the requested printing from the printing apparatus group based on the accumulated power consumption, comprises: an acquisition unit configured to acquire the print request from the client; a selection unit configured to select the first printing apparatus when the accumulated power consumption is not more than a first threshold, and selects the second printing apparatus when the accumulated power consumption is higher than the first threshold; and an accumulation unit configured to add a power to be consumed by the printing apparatus selected by the selection unit to process the print request to the accumulated power consumption stored in the storage unit.

According to another aspect of the invention, an information processing method to be performed by an information processing apparatus that includes a storage unit configured to store an accumulated power consumption, within a predetermined period, of a printing apparatus group including a first printing apparatus and a second printing apparatus whose performance and power consumption upon printing are lower than those of the first printing apparatus, and upon receiving a print request from a client, selects a printing apparatus to execute the requested printing from the printing apparatus group based on the accumulated power consumption, comprises the steps of: acquiring the print request from the client; selecting the first printing apparatus when the accumulated power consumption is not more than a first threshold, and selecting the second printing apparatus when the accumulated power consumption is higher than the first threshold; and adding a power to be consumed by the printing apparatus selected in the selecting step to the accumulated power consumption stored in the storage unit.

According to the present invention, power consumption is efficiently suppressed to a target power consumption or less by power control based on the target power consumption in consideration of a changing user service.

Further features of the present invention will become apparent from the following description of exemplary embodiments (with reference to the attached drawings).

BRIEF DESCRIPTION OF THE DRAWINGS

FIGS. 10A to 10C are views showing examples of power tables in the respective processes;

FIG. 13 is a table showing monthly target power consumptions considering monthly weights;

FIG. 15 is a view showing an example of a power control determination table;

FIG. 16 is a view showing an example of a power control condition table;

DESCRIPTION OF THE EMBODIMENTS

Figure 1:
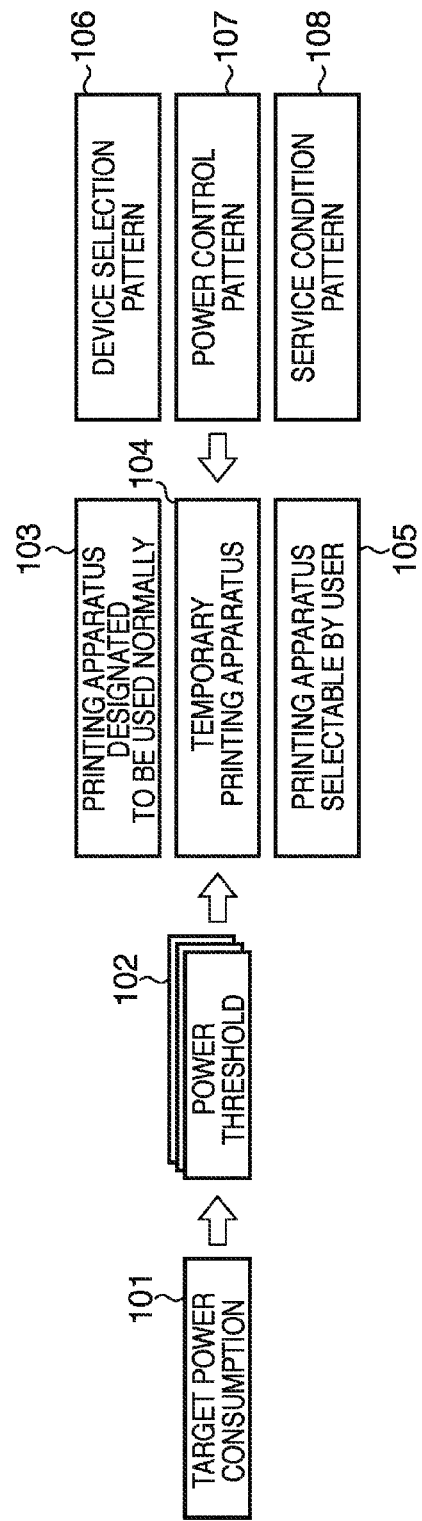
FIG. 1 is a block diagram showing printing apparatus categories based on power thresholds.

FIG. 1 is a block diagram showing the summary of power control of a printing system according to the embodiment. In this embodiment, power control of a printing system including a plurality of printing apparatuses connected via a network is executed to achieve a target in accordance with a given target power consumption 101.

More specifically, an arbitrary number of power thresholds 102 are provided in correspondence with the target power consumption 101. Three categories of printing apparatuses in the printing system, that is, a printing apparatus 103 designated to be used mainly, a printing apparatus 104 designated to be used temporarily, and a printing apparatus 105 selectable by the user are decided based on the power thresholds. At the same time as the calculation of the power thresholds 102, a device selection pattern 106, a power control pattern 107, and a service condition pattern 108 are created. The printing apparatuses 103 to 105 corresponding to the three categories are decided based on the device selection pattern 106. The power levels of each printing apparatus after initial activation and after completion of print processing are decided based on the power control pattern 107. Service details such as the location of the output destination printing apparatus, the time until completion of print processing, and usable functions are decided based on the service condition pattern 108 in correspondence with each power threshold. Creation of the three patterns 106 to 108 can be done based on calculation of the power thresholds 102, and vice versa.

As described above, the power control of this embodiment is characterized by uniquely deciding one of the three printing apparatus categories 103 to 105 based on the power thresholds 102 and the three patterns 106 to 108 to achieve the target power consumption 101. Although it is generally difficult to make power saving control and user convenience compatible with each other, the power control method is implemented while minimizing deterioration of the user convenience. Each embodiment will be described below in more detail with reference to the accompanying drawings.

Figure 14:
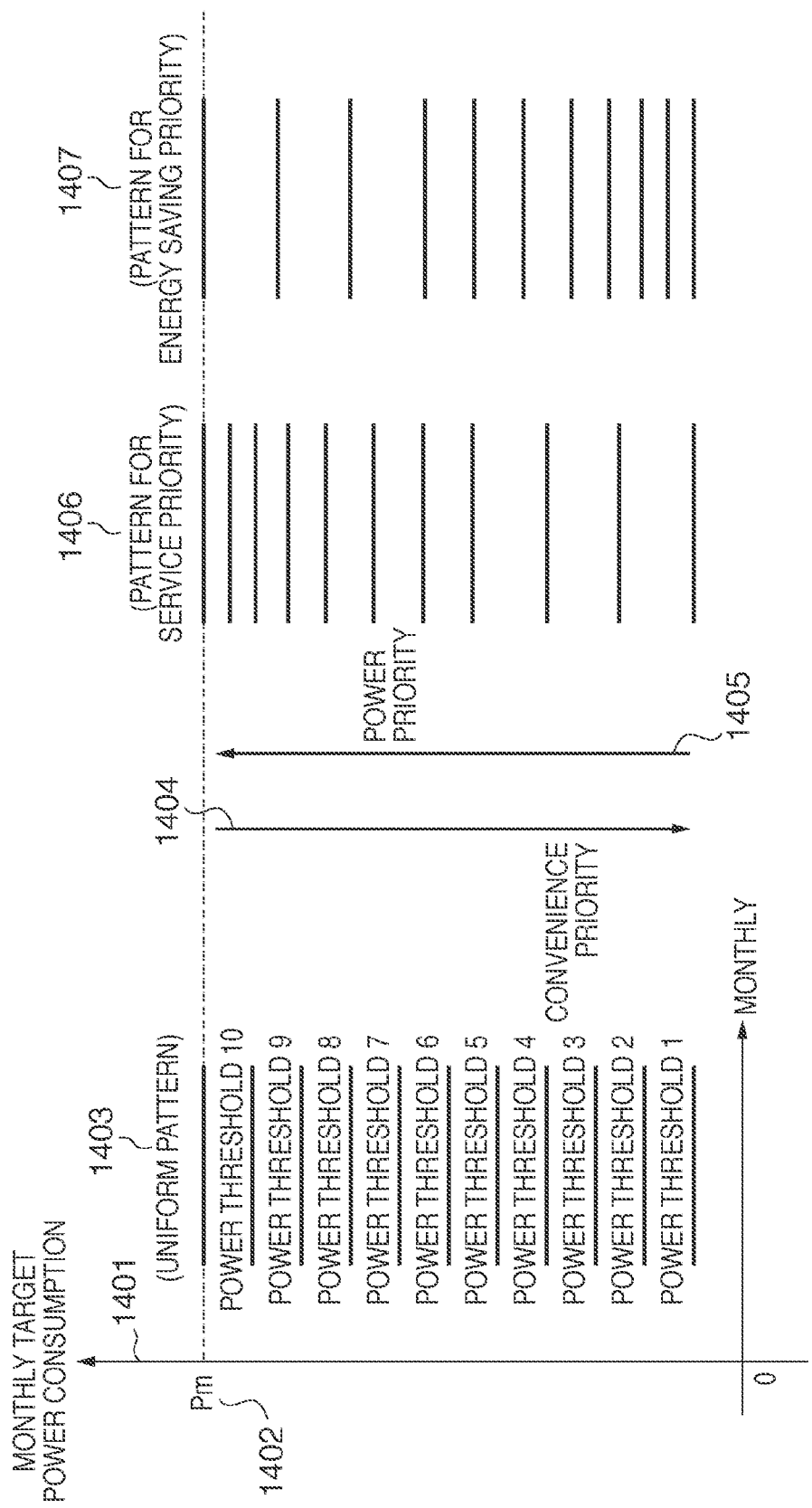
FIG. 14 is a view showing examples of power thresholds for various patterns.

In the following explanation, a "power threshold" indicates both a threshold value and a print control state when a certain power threshold is selected. As shown in FIG. 14, a plurality of power thresholds (1 to 10) are set in advance. The total power consumption (accumulated power consumption) increases as printing is performed, as will be described later. One of the plurality of power thresholds is selected such that the total power consumption becomes lower than the selected power threshold. That is, when the total power consumption increases, a higher power threshold is sequentially selected. For example, as shown in FIG. 16, print control information is associated with each power threshold. That is, a server PM performs print control in accordance with the selected power threshold. However, the present invention is not limited to use of the table shown in, for example, FIG. 16. For example, in FIG. 16, a printing apparatus is selected from three printing apparatuses PRN1 to PRN3. Instead, a printing apparatus may be selected from a first printing apparatus and a second printing apparatus.

First Embodiment

Figure 2:
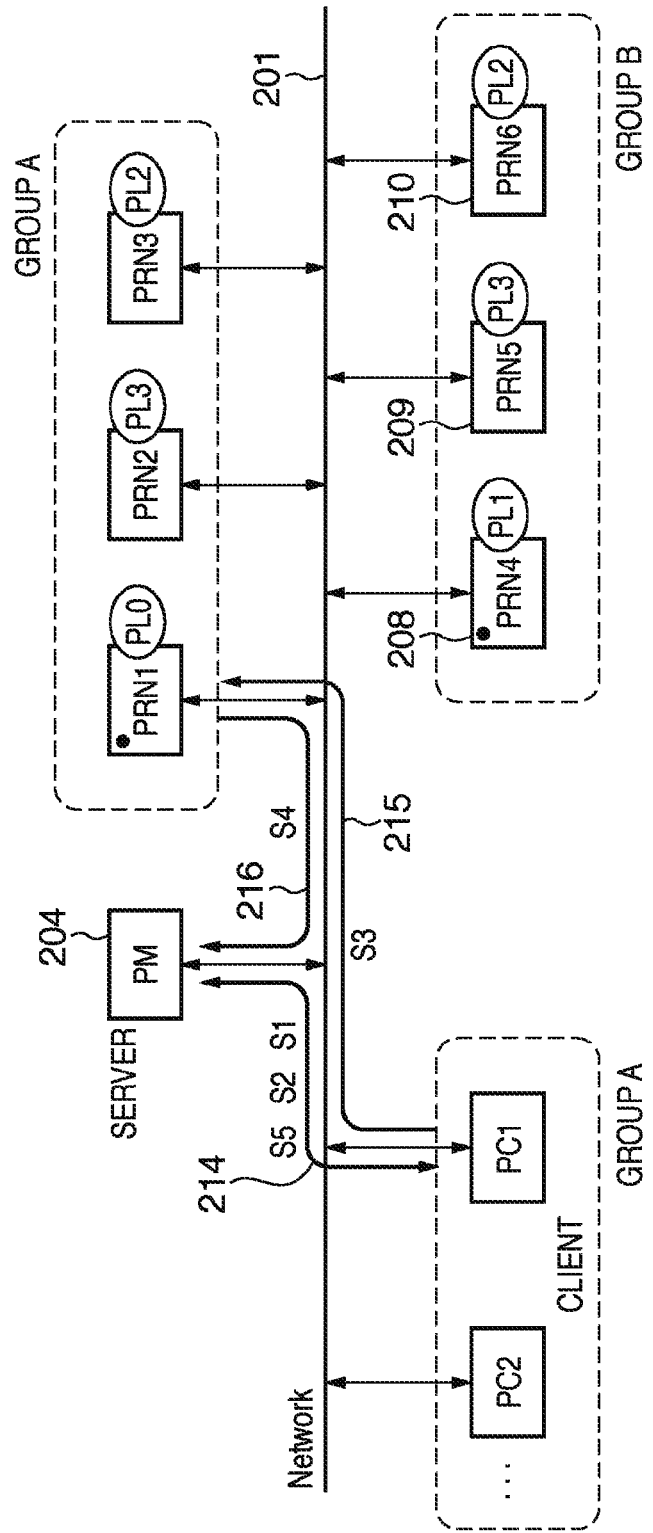
FIG. 2 is a figure illustrating a sequence in performing network print processing.

FIG. 2 is a view showing a basic procedure for network-printing in a printing system according to this embodiment. A plurality of printing apparatuses PRN1 to PRN6, a print manager PM 204, and a plurality of personal computers PC1, PC2, . . . serving as terminals on a network 201 are connected to the network 201. Numbers S1 to S5 attached to arrows 214 to 216 among the PC1, the PM 204, and the PRN1 represent the order of print processing procedure. The details of processing will be described below in the order of numbers. When printing is to be performed from the PC1, the following processing procedure is executed.

In S1 (arrow 214), the printing conditions (contents) are transmitted to the PM 204. The PM 204 analyzes the received printing conditions and selects the optimum printing apparatus PRN1. In S2 (arrow 214), the PM 204 notifies the PC1 of the selected printing apparatus.

In S3 (arrow 215), the PC1 transmits print information including the printing conditions and print data to the designated printing apparatus PRN1. In S4 (arrow 216), the printing apparatus PRN1 transmits the print result to the PM 204 after completion of the print processing. In S5 (arrow 214), the PM 204 transmits the received print result to the PC1. After that, the PC1 notifies the user of the print result, and the user goes to the PRN1 to pick up the printed product. The series of procedures represents the basic processing procedure.

The PM 204 is a print manager that has a server/client relationship with each host PC. Hence, the server software of the print manager is installed in the PM 204, and the client software of the print manager is installed in the host PCs such as the PC1 and the PC2. When installing the client software, the driver software of all printing apparatuses controlled by the server software is assumed to be installed.

The PM 204 with the server software installed in it executes power control of a target printing apparatus in accordance with the power threshold 102 as described with reference to FIG. 1. Note that in the example of the processing procedure shown in FIG. 2, the PC1 transmits print information to the designated printing apparatus PRN1 in S3 (arrow 215). However, the PM 204 may also have a print server function. That is, the PM 204 may transmit the print information.

Figure 3:
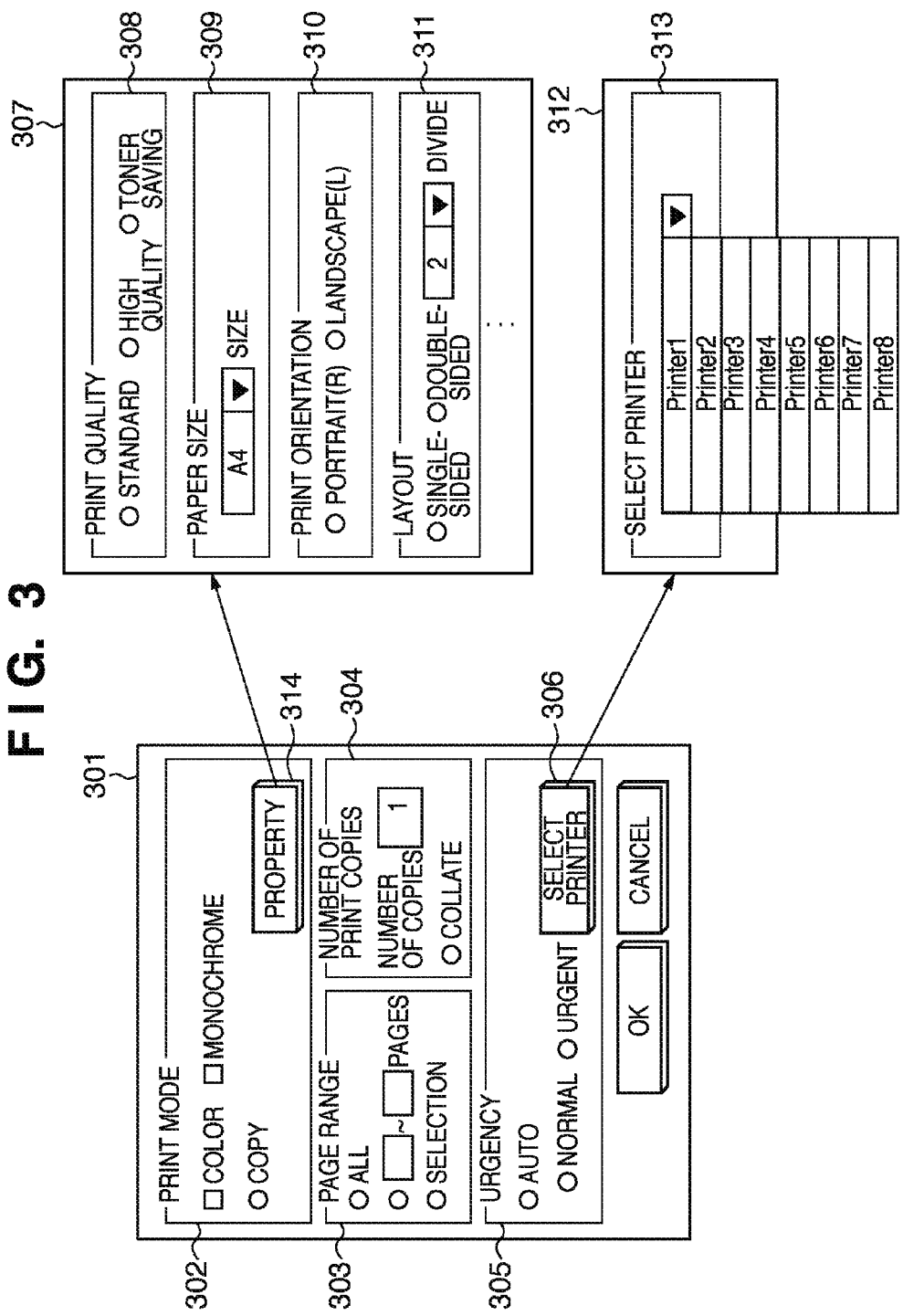
FIG. 3 is a view showing an example of the user window screen of a client of a print manager.

FIG. 3 shows an example of a user window screen that is displayed when the client software of the print manager installed in each host PC such as the PC1 or the PC2 is activated. A user window screen 301 includes items of a print mode 302, a page range 303, a number 304 of print copies, and an urgency 305. A property screen 307 opens upon clicking on a property button 314 included in the print mode 302.

The user can set print quality 308, paper size 309, print orientation 310, and layout 311 on the property screen 307.

As described above, the printing apparatus is basically designated on the server side of the print manager. That is, the urgency 305 on the user window screen has a check mark on "auto" by default. However, the user can designate the degree of his/her urgency (urgent/normal) and select a printer as settings other than the default in the item of the urgency 305.

When the user clicks on a printer select button 306 in the urgency 305, a printer select screen 312 opens. On the printer select screen 312, the user can select a printing apparatus with corresponding driver software installed in it. The printing conditions set in the user window screen 301 are transferred to the server of the print manager in S1 (arrow 214) described with reference to FIG. 2, thereby designating the printing apparatus. When the client of the print manager transfers the parameters to the driver software of the designated printing apparatus in S3 (arrow 215) of FIG. 2, actual print processing starts.

Figure 4:
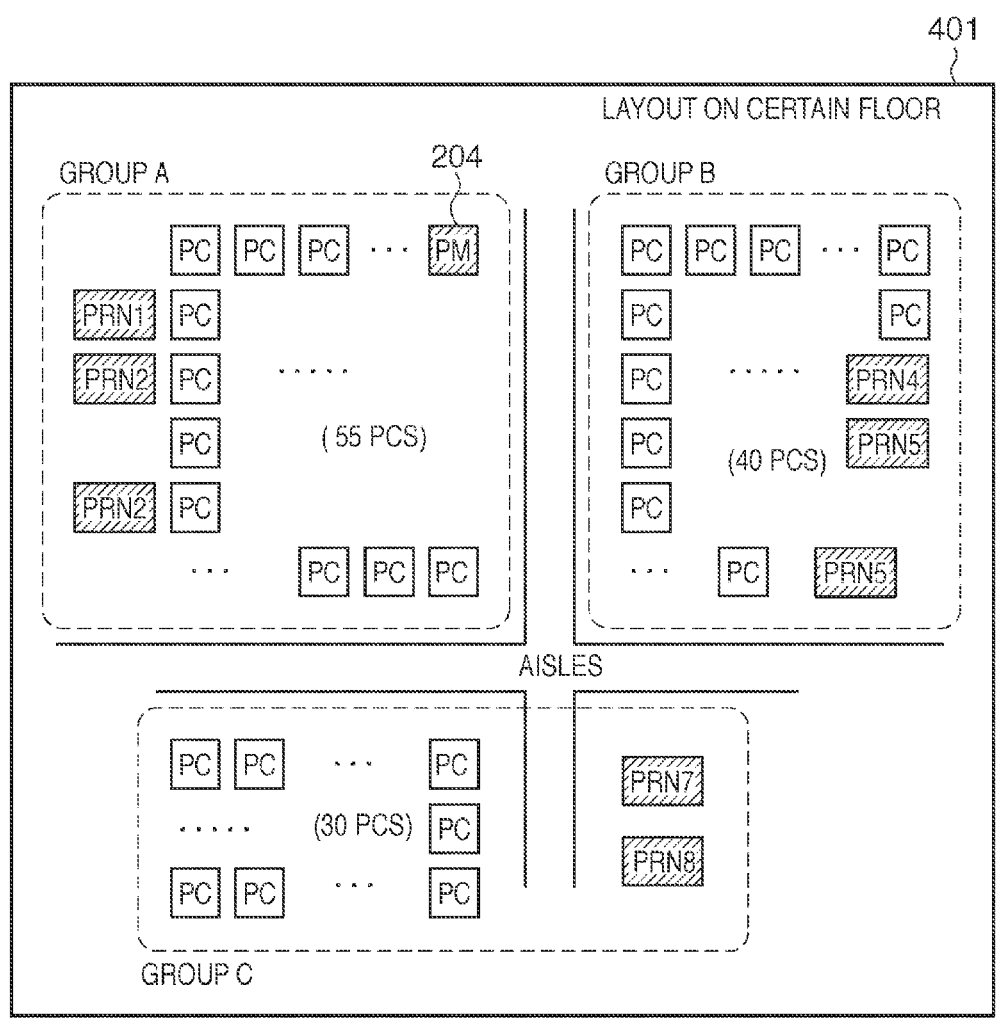
FIG. 4 is a view showing an example of the layout of printing apparatuses and PCs.

A group A and a group B shown in FIG. 2 will be described with reference to FIG. 4. FIG. 4 illustrates a layout 401 of the personal computers PC, the print manager PM 204 serving as the server, and the printing apparatuses PRN1 to PRN8 on a certain floor. The group A is the group of PCs (55 PCs) close to the printing apparatuses PRN1 to PRN3 in terms of distance. Similarly, the group B is the group of PCs (40 PCs) close to the printing apparatuses PRN4 to PRN6, and a group C is the group of PCs (30 PCs) close to the printing apparatuses PRN7 and PRN8. That is, the grouping is done in consideration of the distance convenience for the users who use the printing apparatuses.

As shown in FIG. 2, in response to a print request from the PC1 belonging to the group A, the print manager PM 204 selects the printing apparatus PRN1 of the same group. Note that a printing apparatus indicated by "●" in each group such as the printing apparatus PRN1 or PRN4 in FIG. 2 is the printing apparatus 103 currently designated to be used mainly in that group.

A printer designated to be used mainly will be referred to as a "designated printing apparatus" hereinafter. A code such as PL0 added to each printing apparatus indicates a power level designated by the power control pattern 107 corresponding to the level of the power threshold 102. Power control will be described later.

Figure 5:
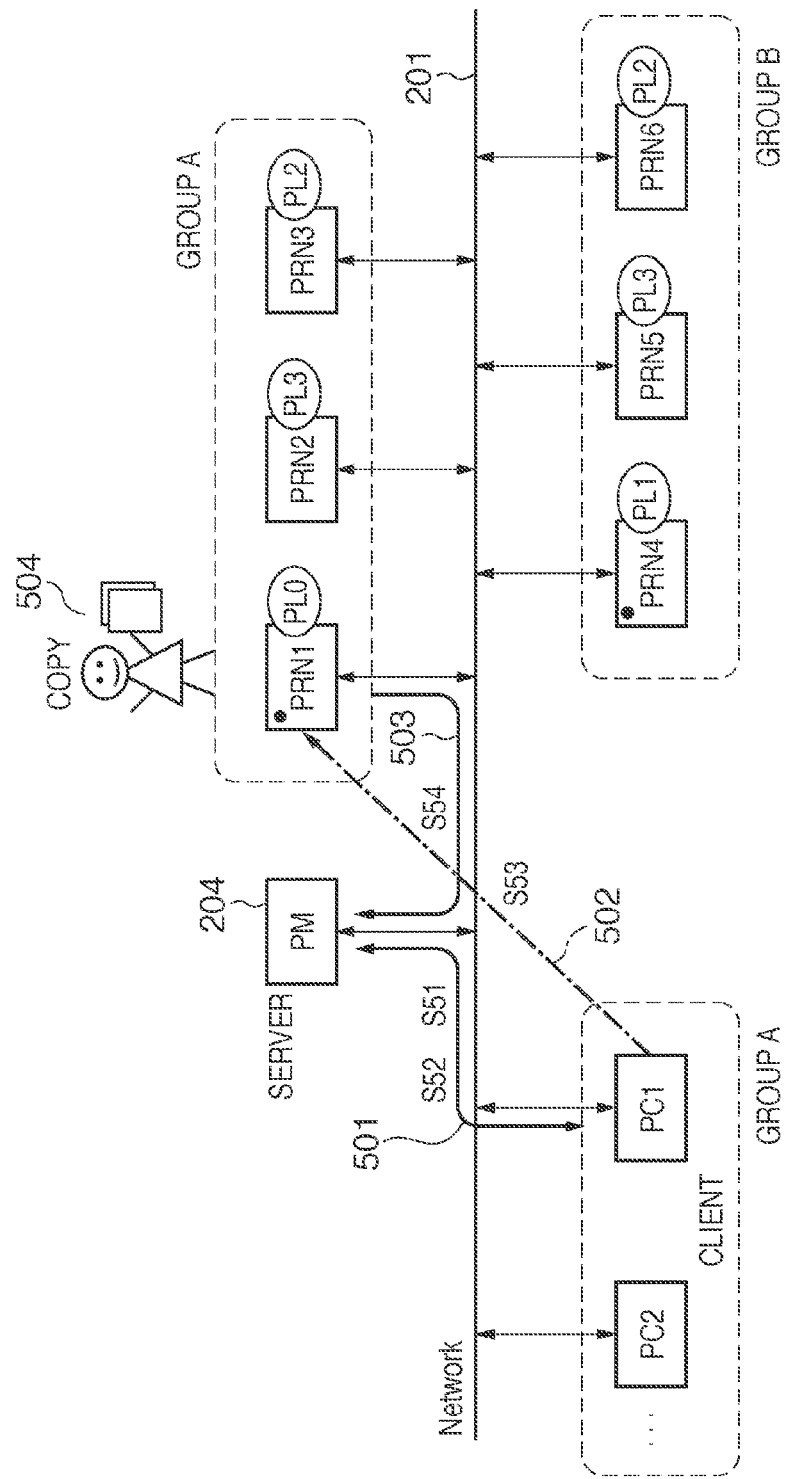
FIG. 5 is a figure illustrating an operation sequence in copying via a client PC.

Several examples will be explained concerning print procedures other than network-printing. FIG. 5 is a figure illustrating the basic print procedure in copying. A case is assumed in which the user of the PC1 of the group A wants to do copy print from his/her desk. Numbers S51 to S54 attached to arrows 501 to 503 in FIG. 5 represent the print procedure.

The user of the PC1 checks "copy" in the print mode 302 on the user window screen 301 and sets other necessary printing conditions. When using default values, the user need only check "copy". In S51 (arrow 501), the PC1 transmits print information including the printing conditions and print data to the PM 204 to send a print instruction. The PM 204 analyzes the printing conditions and selects an optimum printing apparatus based on the current power threshold 102. The PM 204 normally selects the designated printing apparatus in the same group as that of the user. In S52 (arrow 501), the PM 204 notifies the PC1 of the selected designated printing apparatus.

In S53 (arrow 502), the PC1 notifies the user of the selected designated printing apparatus. The user goes to the PRN1 that is the notified designated printing apparatus to execute a copy operation 504. In S54 (arrow 503), the PRN1 transmits the copy print result to the PM 204 after completion of copy print.

Figure 6:
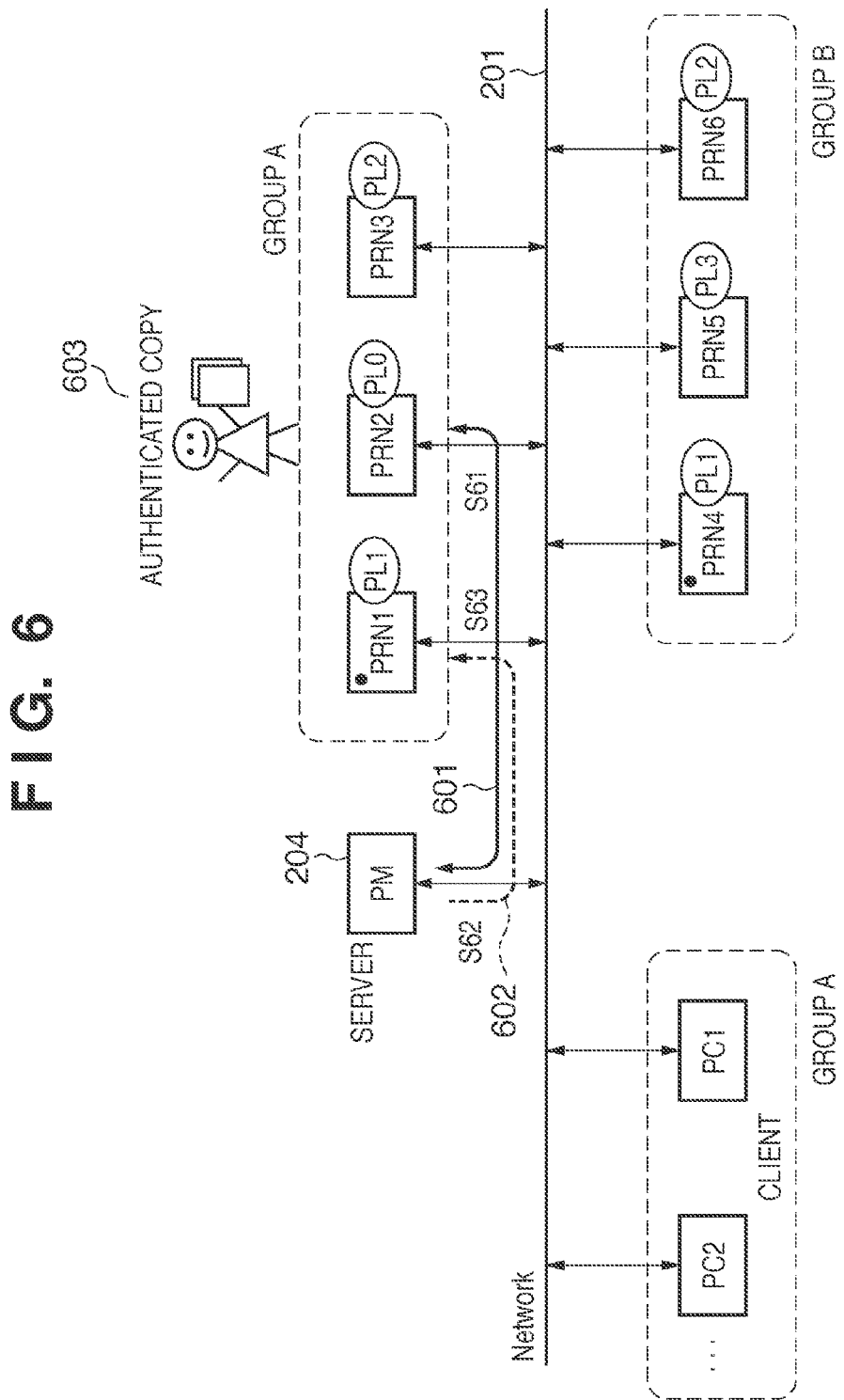
FIG. 6 is a figure illustrating an operation sequence in copying without intervention of a client PC.

An example will be described in which the user goes from a place other than his/her PC to a printing apparatus to execute printing. FIG. 6 illustrates an example in which the user suddenly executes copy print on the printing apparatus PRN2. Even during power control by the PM 204, it is possible to execute an authentication operation so as to permit a print action such as copy print in consideration of user convenience. Numbers S61 to S63 attached to a solid line arrow 601 and a broken line arrow 602 in FIG. 6 represent the print procedure.

In S61 (arrow 601), the printing apparatus PRN2 notifies the PM 204 that the user authentication operation has ended, and the printing apparatus is set in the standby state ready to print. In S62 (arrow 602), if the printing apparatus is different from the current designated printing apparatus, the PM 204 performs power control so that the printing apparatus shifts to the power saving mode as needed. If the printing apparatus is operating for, for example, printing, the PM 204 may be prohibited from performing the control. In this case, since the PRN2 is the designated printing apparatus, the PM 204 sends the copy print permission to the PRN2.

The PRN2 executes the copy print processing. After completion of processing, in S63 (arrow 601), the printing apparatus transmits the print result to the PM 204. An example in which sudden copy print by the user occurs has been described. However, the processing procedure described with reference to FIG. 6 is applicable to direct printing that executes printing by directly connecting a memory device to a printing apparatus or printing a FAX received by FAX reception.

The basic print processing sequence according to the first embodiment has been described above. Details of the power control method will be described next. Note that the following explanation assumes the layout of the PM 204, the PRN1 to PRN8, and the like on a certain floor as shown in FIG. 4.

Figure 7:
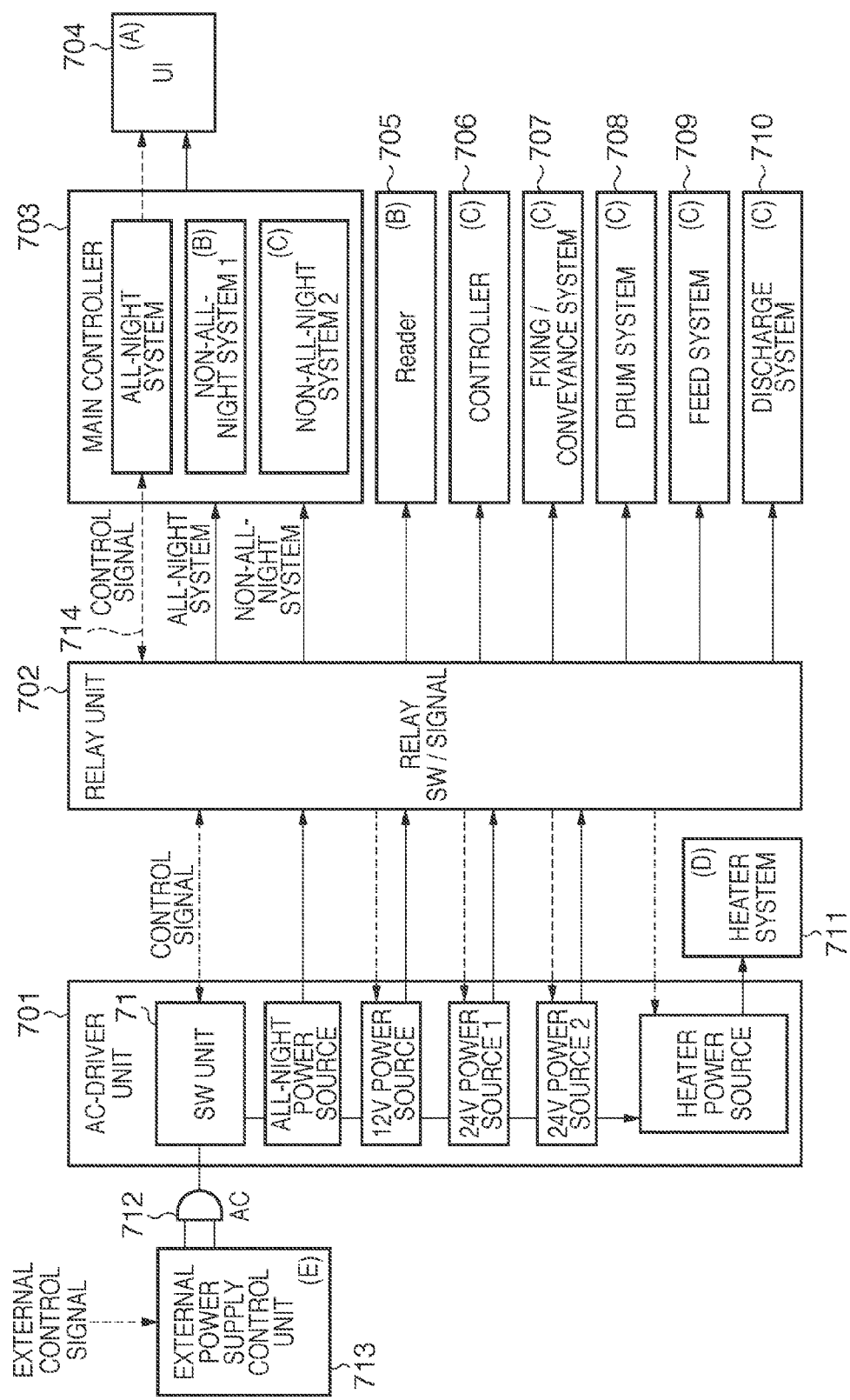
FIG. 7 is a block diagram showing power control in a printing apparatus.

FIG. 7 is a block diagram showing an example of power supply control in a printing apparatus. When an AC line 712 is connected to a wall socket, and an SW unit 71 of the main power supply is turned on, AC power is supplied to an AC-DRIVER unit 701. Various kinds of internal power sources are thus generated. In this embodiment, an all-night power source, 12V power source, 24V power source 1, 24V power source 2, and heater power source are generated at predetermined timings in the AC-DRIVER unit 701. The generated power sources are basically temporarily distributed to the respective blocks via a RELAY unit 702.

Examples of blocks to which power is supplied are a Main controller 703, a user interface UI 704, a Reader 705, a D (device) controller 706, a fixing/conveyance system 707, a drum system 708, a feed system 709, a discharge system 710, and a heater system 711. A description of each block will be omitted here. Power supply to the blocks 703 to 711 can be on/off-controlled by the RELAY unit 702.

The Main controller 703 performs processing of acquiring input data from various kinds of interfaces (for example, the UI 704, the Reader 705, or a network (not shown)) and generating print data. The D controller 706 of the next stage executes processing of printing the print data generated by the Main controller 703 on a paper sheet by controlling the functions of the blocks 707 to 710 of the printing apparatus main body. The Main controller 703 also executes power supply control of the entire printing apparatus, as shown in FIG. 7.

The solid line arrows in FIG. 7 indicate power supply lines, and the broken line arrows indicate control signals. The all-night system of the Main controller 703 indicates the power supply that always continuously supplies power even in the power saving mode. A non-all-night system indicates the power supply that is shut down in the power saving mode. In this embodiment, the Main controller 703 includes one all-night system and two non-all-night systems.

The power supply control procedure will be described. First, the SW unit 71 of the AC-DRIVER unit 701 is turned on to supply power to each block. When the Main controller 703 itself is activated by this power supply, the blocks 704 to 710 and the power sources of the AC-DRIVER unit 701 are on/off-controlled using a power supply control signal 714 to the RELAY unit 702 in accordance with a predetermined power supply control sequence. Power saving groups (A) to (E) of the blocks in FIG. 7 represent grouping associated with the power saving level. For example, turning off the power supply to the non-all-night system 1 of the Main controller 703 means shutting down the power supply to the power saving groups (A) and (B), that is, the blocks 704 and 705. Turning off the power supply to the non-all-night system 2 means shutting down the power supply to the power saving groups (A) to (C), that is, the blocks 704 to 710.

The relationship between the power saving levels and the power saving groups (A) to (E) of the blocks shown in FIG. 7 will be described with reference to FIG. 8. Power shutdown regions 801 of the table shown in FIG. 8 correspond to the power shutdown regions (A) to (E) in FIG. 7. Power saving levels 802 of the table represent power saving levels corresponding to the power shutdown ranges of the power saving groups (A) to (E). In the table, "◯" indicates a power ON region, and "x" indicates a power shutdown region.

PL0 (Power Level 0) indicates a full power ON state that is the Standby state in which print processing is immediately possible. At PL1, the power is shut down in the region (A). At PL2, the power is shut down in the regions (A)+(B). As the numerical value annexed to PL increases, the power saving level rises, and the shutdown region becomes large.

PL5 that is the highest level indicates that the power is shut down in all regions, that is, the AC power supply to the printing apparatus main body is stopped. This is expressed in FIG. 7 as a configuration in which an external power supply control unit 713 is arranged outside the AC power supply line 712 to on/off-control the power based on an external control signal. As another method, a timer circuit and a backup battery may be provided in the SW unit 71 of the AC-DRIVER unit 701 to on/off-control the power based on the time set in the timer circuit. Hence, control of the power shutdown region (E) can be done either outside or inside the AC power supply line 712.

Figures 8, 9:
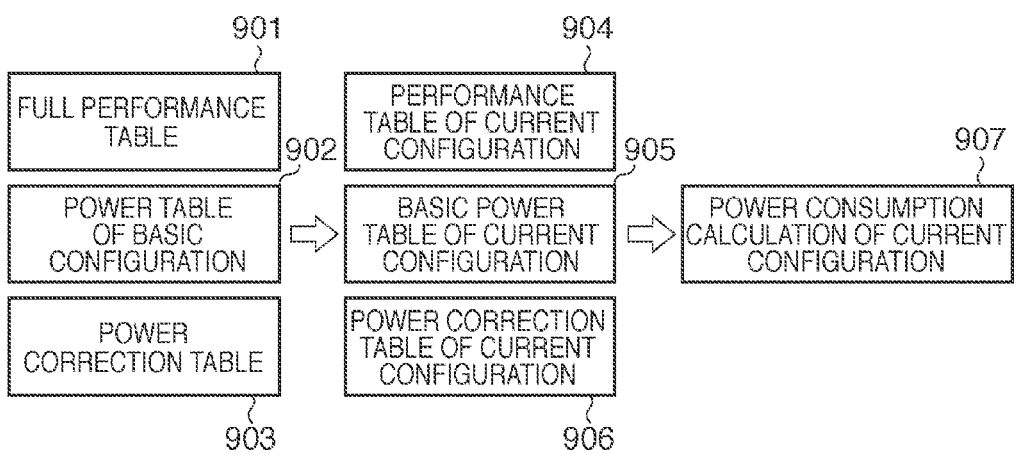
FIG. 8 is a view showing the relationship between the power saving levels and the power shutdown regions.
FIG. 9 is a view showing the process of calculating power consumption from power tables.

A WakeUpTime 803 that is an item of the table of FIG. 8 represents the return time from each of the states of power saving levels PL0 to PL5 to the Standby state. As can be seen, the higher the required power saving level is, the longer the return time to the Standby state is. That is, this means that the higher the power saving level is, the poorer the user convenience is.

The contents described with reference to FIGS. 7 and 8 indicate an already standard technique. As the shift time designations to the power saving levels, default values set at the time of shipment or values set by the user at the time of operation have been used. In this embodiment, the print manager serving as the server gives the initial value of each power saving level of each printing apparatus.

An example of power consumption calculation will be described next. FIG. 9 is a view showing the procedure of calculating power consumption using various tables. A full performance table 901 of a target printing apparatus, a power table 902 of the basic configuration, and a power correction table 903 are set in advance. The full performance table 901 is a list of all functions the printing apparatus can ensure. This list includes the printing performance, the resolution, the extension accessories of the feed system and the discharge system to be added to the basic configuration, and optional kits such as an IC card and an encryption board. The power table 902 of the basic configuration indicates a reference power consumption in reference processing in the minimum basic configuration of the target printing apparatus. For example, when reference processing sets {paper size: A4, layout: single-sided, resolution: 600 dpi, print mode: color, and print quality: standard}, power consumption measured for the reference processing in advance is the reference power consumption. The power correction table 903 is a table to be used to obtain the correction amount from the reference power consumption. This table is used to obtain the expanded consumption due to the extension accessories and optical kits from the basic configuration or the correction amount from the reference processing based on actual printing conditions (the number of printing pages, paper size, print mode, print quality, special image processing, and the like).

From the above-described three basic tables 901 to 903, tables for the current configuration corresponding to the three tables are created based on the current configuration of the target printing apparatus. The tables are a performance table 904 of the current configuration, a basic power table 905 of the current configuration, and a power correction table 906 of the current configuration. Power consumption calculation 907 for the current configuration is finally executed using the basic power table 905 of the current configuration and the power correction table 906 of the current configuration. The power correction table 906 of the current configuration can be regarded as a table obtained by removing unnecessary functions from the power correction table 903 of full performance to modify it for the current configuration. The performance table 904 of the current configuration is used as basic data to create the power control determination table of each printing apparatus to be described later.

A detailed example of the basic power consumption table 905 of the current configuration will be described with reference to FIGS. 10A to 10C. FIG. 10A shows an example of a table that creates power consumptions in the respective power states and power consumptions upon power state transition in the current configuration. In this embodiment, the printing apparatus is assumed to have the power saving levels described with reference to FIG. 8.

This table includes a power state 1001 and a power consumption 1002 in that state. PL4→PL0 or PL5→PL0 indicates a power consumed at the time of transition from the power saving level PL4 (or PL5) to PL0 (Standby). According to the table in FIG. 10A, an accumulated value can be obtained by accumulating power consumptions except that during non-processing, based on the current steady power consumption and the power consumption at the time of transition. FIG. 10B shows an example of a table that creates a reference power consumption corresponding to a resolution 1003 and a layout 1004 based on the A4 size and one color-printed page in the current configuration.

The power consumption in actual print processing can be calculated by ratio calculation using the power correction table 906 of the current configuration for the printing conditions at that time based on the reference power consumption in the table of FIG. 10B. Note that the conditions that determine the reference power consumption are not limited to those of the example, and optimum conditions can be selected.

FIG. 10C shows an example of a table that creates a reference power consumption in non-print processing. This table includes a processing content 1005 and a reference power consumption 1006 necessary for the processing. Several representative examples of the non-print processing will be described. "Scan to Send" is a service that transfers image data scanned by the Reader of a printing apparatus to a designated address on the network.

"BOX to Send" is a service that transmits data in a Box (hard disk device) to a designated address on the network. "Send to BOX" is a service that stores data transmitted from an external network in the BOX of a designated address.

These processes include no print action but data transmission/reception. Hence, the reference power consumption 1006 in the current configuration is defined for the reference data size of each process. The power consumption in non-print processing can also be calculated by ratio calculation using the power correction table 906 of the current configuration for an actual non-printing condition such as the process data size based on the reference power consumption 1006, as in print processing.

Figure 11A:
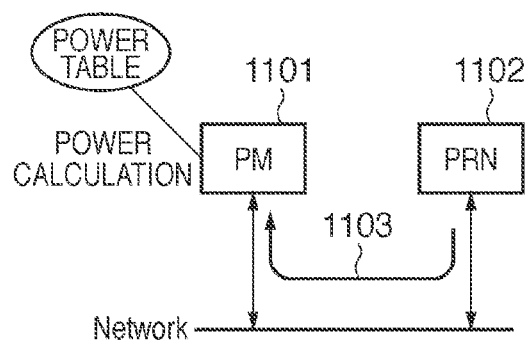
FIGS. 11A to 11C are views showing power consumption calculation in the respective power table dispositions.
Figure 11B:
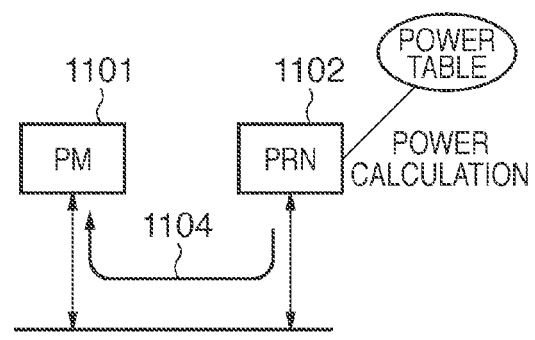
Figure 11C:
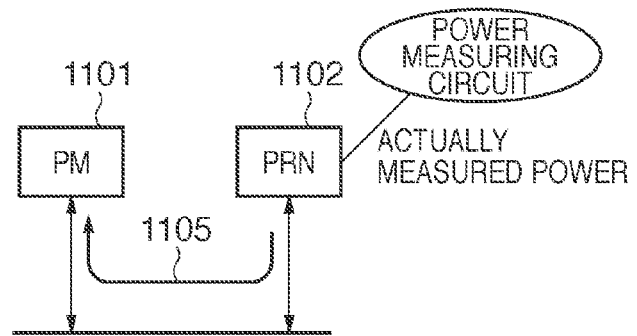

Examples of power consumption calculation will be described next with reference to FIGS. 11A to 11C. FIGS. 11A to 11C show three examples of calculation of the power consumption of the target printing apparatus. Referring to FIG. 11A, the power tables 905 and 906 exist on the side of a print manager PM 1101 serving as a server. The PM 1101 receives a processing result report 1103 from a printing apparatus PRN 1102, thereby calculating a power consumption for the processing result report 1103 and also calculating the accumulated power consumption of the PRN 1102. The processing result report 1103 includes the reports of print processing and non-print processing, as described with reference to FIGS. 9 and 10A to 10C. The accumulated power consumption includes the standby power consumption of each of the levels PL0 to PL5 and the transition power consumption between the PL levels.

In FIG. 11B, the power tables 905 and 906 are held on the side of the PRN 1102. In this case, the PRN 1102 calculates the accumulated power consumption of its own and sends it to the PM 1101 together with a processing result report 1104. Based on the received processing result report 1104, the PM 1101 updates the accumulated power consumption of the PRN 1102 and calculates the total accumulated power consumption of the printing system. FIG. 11C shows a form in which the PRN 1102 includes a power measuring circuit to actually measure the power consumption and sends it to the PM 1101 together with a processing result report 1105. Based on the received processing result report 1105, the PM 1101 updates the accumulated power consumption of the PRN 1102 and calculates the total accumulated power consumption of the printing system. This method is accurate because of the minimum error in the accumulated power consumption. However, the hardware circuit is complicated, directly leading to an increase in the cost.

As described above using FIGS. 11A to 11C, power consumption calculation of each printing apparatus according to this embodiment need only be executed on the side of either the print manager PM 1101 or the printing apparatus. The power consumption calculation method is not limited to that using the power table 905 or 906, and any other method is usable if it can obtain the same result.

A power control method serving as the core of the embodiment will be described below. An example of the method of deciding the power thresholds 102 for the target power consumption 101 described with reference to FIG. 1 will be explained first.

Figure 12:
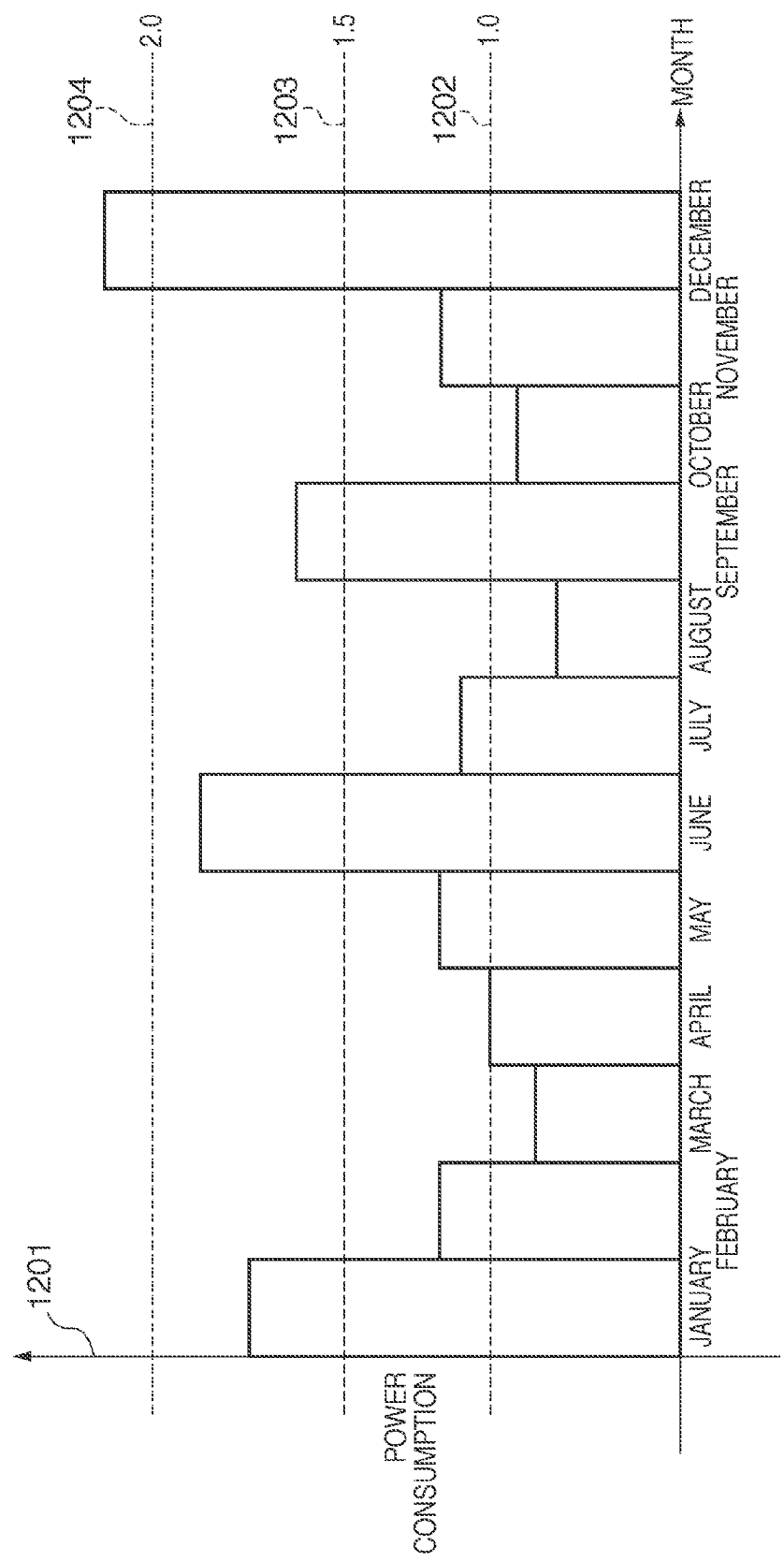
FIG. 12 is a graph showing an example of monthly power consumptions of the printing system on a full-year basis.

FIG. 12 is a graph of the power consumption of a printing apparatus on the certain floor described with reference to FIG. 4 within a monthly set predetermined period. The power consumption is high in January, June, September, and December, as is apparent. That is, the printing apparatus use frequency is higher in these periods than in the remaining months. Assume that a graph 1201 of FIG. 12 represents the result of last year, and the total power consumption of the printing apparatus is planned to be lower by 10% this year than that of last year. Let Py be the annual target power consumption of this year. As described above, the monthly unevenness is large on a full-year basis. For this reason, the annual target power consumption is further decomposed to calculate a monthly target power consumption Pm.

Broken lines 1202 to 1204 on the graph 1201 of FIG. 12 indicate weighting lines to be used to calculate the monthly power consumption Pm. The power consumption corresponding to the weighting line 1203 is 1.5 times as high as the power consumption corresponding to the weighting line 1202. The power consumption corresponding to the weighting line 1204 is twice as high as the power consumption corresponding to the weighting line 1202. When the monthly minimum power consumption unit is defined as P0, P0 is uniformly given as the monthly target power consumption to each month where the power consumption does not reach the weighting line 1203. A monthly target power consumption corresponding to 1.5×P0 is given to each month where the power consumption ranges from the weighting line 1203 (inclusive) to the weighting line 1204 (exclusive). A monthly target power consumption corresponding to 2.0×P0 is given to each month where the power consumption reaches the weighting line 1204.

FIG. 13 is a table that provides a summary of the monthly target power consumptions described above. This table includes a monthly power 1301 and a power consumption 1302 of each month. The last item indicates the month sum which equals an annual target power (consumption) Py 1303. Hence, when the annual target power consumption Py 1303 is given, the minimum power consumption unit P0 is obtained, and the monthly target power consumption Pm is given.

The power threshold 102 for the given monthly target power consumption Pm will be described next with reference to FIG. 14. A graph 1401 of FIG. 14 represents an example in which the power threshold 102 is divided into 10 values in a uniform pattern 1403 with a target power consumption Pm 1402 of a certain month defined as the upper limit. Service details to be provided to the user are uniquely determined in accordance with each of power thresholds 1 to 10.

Two arrows 1404 and 1405 beside the graph 1401 indicate the degrees of service priority for the user. In a state with a low power threshold, the service is prioritized due to the higher user convenience priority 1404. As the power threshold becomes higher, the pressure on the power consumption becomes tighter. Hence, power limitation is prioritized over the service. That is, as the power threshold comes closer to the monthly target power consumption Pm 1402, power control is done to make the power priority 1405 higher. This means that, for example, the power consumption is controlled based on a low power threshold at the start of a month, but as the month gradually nears the end, based on a high power threshold, that is, a threshold closer to the monthly target power consumption Pm. That is, at the start of a month, since the allowance to the target power consumption Pm is large, the use restriction is loose, and the user servability is high. As the time elapses, the user servability lowers, and the use restriction of the printing apparatus becomes tough.

(B) and (C) of FIG. 14 show other pattern examples different from the uniform power threshold pattern of (A). A service priority pattern 1406 in (B) of FIG. 14 is formed by nonuniformly narrowing the interval of the uniform pattern 1403 of (A) toward the high power threshold side. If the service details corresponding to the power thresholds of the uniform pattern 1403 are the same, the service priority pattern 1406 indicates that, for example, the service priority becomes higher in correspondence with power thresholds 1 to 5 that are selected for a longer period.

In an energy saving priority pattern 1407 in (C) of FIG. 14, the unevenness of power thresholds is reverse to that of the service priority pattern 1406 of (B). In this case, for example, power thresholds 6 to 10 are selected for a longer period at the time the pressure on the power consumption is tight, and the energy saving priority is therefore higher. Causing the administrator to set the three patterns 1403, 1406, and 1407 enables to change the power control policy.

As described above, to decide the power thresholds 102 in FIG. 1, each threshold is set in correspondence with the target power consumption to be set. However, the present invention is not limited to this form. For example, the power per hour to be consumed in a day is uneven. In the above-described example, a relatively small number of power thresholds are set to eliminate the influence of such unevenness. However, more power thresholds may be decided to allow the influence of power consumption unevenness. In that case, the degree of power consumption unevenness needs to be taken into consideration to decide the service details corresponding to each power threshold and the power threshold intervals of the three power threshold patterns 1403, 1406, and 1407 and the like. When considering the degree of power consumption unevenness, the algorithm of the power threshold deciding method accordingly becomes more complex.

An example of a power control condition table to be used to designate the power state of each printing apparatus corresponding to the power threshold 102 in FIG. 1 and set the service details will be described next with reference to FIG. 15. FIG. 15 shows a power control determination table 1501 generated in the print manager serving as the server as a determination material to be used to create a power control condition table. This table includes printing apparatuses 1 to 8 plotted vertically and a designated Power level 1502 and a designated Spec level 1503 plotted horizontally. Printing apparatuses 1 to 8 correspond to the eight printing apparatuses PRN1 to PRN8 in the example on the certain floor in FIG. 4.

The Power level 1502 represents the power consumption of each printing apparatus. The Power level 1502 is obtained as, for example, a simulation value for each of models that are predetermined to be activated from the energy saving mode standby state for a predetermined period to the standby state to perform processing under predetermined conditions. The power consumption as the simulation value can also be obtained from the basic power table 905 of the current configuration and the power correction table 906 of the current configuration in FIG. 9.

The power consumption calculated as a simulation value is compared with 10 predetermined numerical values, thereby representing the Power level 1502 of each of printing apparatuses 1 to 8 as a value. In this case, the larger the numerical value is, the higher the power consumption is, and the lower the capability evaluated by the Power level 1502. Numerical value 5 is the intermediate standard level for printing apparatuses 1 to 8.

The Spec level 1503 represents the functional capability of each printing apparatus. Like the Power level 1502, setting, for example, 4 as the standard level that can cope with a user's printing condition, six numerical values are predetermined in total around the value 4, and the evaluation value is obtained from the performance table 904 of the current configuration of each printing apparatus. Regarding the Spec level 1503 corresponding to each of printing apparatuses 1 to 8, the larger the numerical value is, the higher the specifications are.

When the Power level 1502 and the Spec level 1503 of the power control determination table 1501 are represented by a set (x,y), the determination can be done in the following way. For example, printing apparatus 1=(9,6) is determined to "have a high power consumption but be the best in functional level so as to be able to cope with any user's print request". Printing apparatus 4=(4,4) is determined to, for example, "be an average printing apparatus in terms of both the power consumption and the function".

An item "Grouping" 1504 of the power control determination table 1501 represents grouping of groups A, B, and C in the example on the certain floor in FIG. 4. In FIG. 15, printing apparatuses 1 to 3 are put into the group A, printing apparatuses 4 to 6 are put into the group B, and printing apparatuses 7 and 8 are put into the group C, as indicated by the broken line rectangles.

A final selection order 1505 represents a printing apparatus be left as the final candidate when the power threshold has reached several high levels and its priority order. In the final selection order 1505, printing apparatus 4 is selected as the first candidate, and printing apparatus 8 is selected as the second candidate. The items of the Grouping 1504 and the final selection order 1505 may be set by the administrator or adjusted by the administrator to optimum conditions calculated by the print manager PM 204 serving as the server.

FIG. 16 shows an example of a power control condition table 1601 for the group A created to control the power consumptions and service details of printing apparatuses 1 to 3 in association with the power thresholds 102. Power control condition tables for the group B including printing apparatuses 4 to 6 and the group C including printing apparatuses 7 and 8 are also created similarly. Service details are plotted horizontally in correspondence with power thresholds 1 to 11 plotted in the vertical direction of the table. Note that numerical values 1, 2, and 3 under a PM designation 1602, user selectable 1603, and power saving level 1604 represent printing apparatuses 1, 2, and 3 belonging to the group A, respectively.

The PM designation 1602 is an item that indicates a designated printing apparatus designated or selected by the PM 204. In the table, "◯" indicates a designated printing apparatus, "Δ" indicates a non-designated printing apparatus to be used temporarily, and "x" indicates an undesignatable printing apparatus (also the PM does not use this printing apparatus).

The user selectable 1603 is an item representing whether a desired printing apparatus can be selected by the printer select button 306 of the user window screen 301 in FIG. 3. "◯" indicates a selectable printing apparatus, and "x" indicates an unselectable printing apparatus.

The power saving level 1604 is an item representing the power saving level of each printing apparatus designated by the PM 204. The power saving levels (PL1 to PL5) exemplified with reference to FIG. 8 may change depending on the printing apparatus. The following description of the embodiment assumes that printing apparatus 1 has PL1 to PL5, printing apparatus 2 has PL1 to PL4, printing apparatus 3 has PL1 to PL3, printing apparatuses 4 to 7 have PL1 to PL4, and printing apparatus 8 has PL1 to PL3 as the power saving levels.

As indicated by the power saving level 1604, the power saving level is set to be lower to prioritize the user convenience when the power threshold is low. As the power threshold becomes higher, the power saving level also gradually rises to prioritize power control.

Print constraints 1 to 3 in an item field 1605 represent the presence/absence of constraints to be imposed at the time of print processing. In the table, "◯" indicates that the constraint is valid, and "-" indicates that the constraint is invalid. As examples of the constraints, constraint 1 is "double-sided printing", constraint 2 is "2-in-1 printing", and constraint 3 is "monochrome printing".

For example, during the period all constraints 1 to 3 are valid, the constraints are imposed to forcibly perform 2-in-1 monochrome printing in the double-sided printing mode (that is, 10 pages will be output) even if the user's printing conditions indicate 40-page color printing in the single-sided printing mode. When print constraints 1 to 3 are valid, the items designatable by the property button 314 of the user window screen 301 in FIG. 3 become undesignatable. If the parameters on which the constraints are imposed are included in the print request conditions, the server PM may be prohibited from accepting the print request or change the parameters. More specifically, as shown in FIG. 16, when power threshold 5 is selected (when the total power consumption is equal to or lower than power threshold 5), the server PM selects the PRN2 that is the designated printing apparatus even if single-sided printing is designated. On the other hand, when power threshold 6 is selected (when the total power consumption is higher than power threshold 5), the server PM may be prohibited from selecting the PRN2 that is the designated printing apparatus if single-sided printing is designated. In this case, printing is not performed. Alternatively, the server PM may select the PRN2 that is the designated printing apparatus and designate double-printing.

Figure 17:
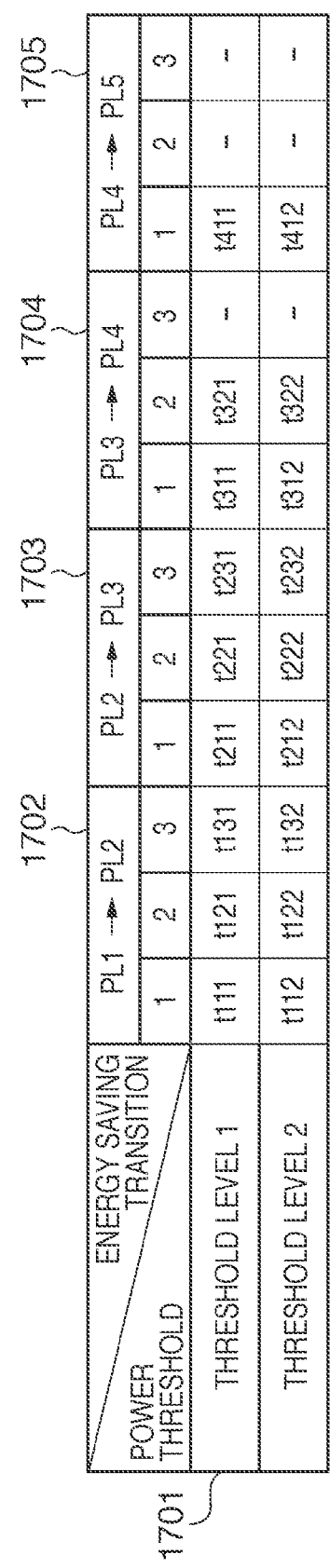
FIG. 17 is a view showing the shift time of an energy saving mode corresponding to a power threshold.

A supplementary explanation will be made concerning control of the power saving level 1604 with reference to FIG. 17. FIG. 17 shows an example of an energy saving mode shift time table 1701 to be used to preset the shift time to each power saving level corresponding to a power threshold. An expression 1702 "PL1→PL2", an expression 1703 "PL2→PL3", an expression 1704 "PL3→PL4", and an expression 1705 "PL4→PL5" represent times to shift to an energy saving mode corresponding to a higher power saving level.

For example, for power threshold 1 of the power control condition table 1601, printing apparatus 1 of energy saving level 1 is assigned to the designated printing apparatus, and printing apparatuses 2 and 3 are assigned to temporary printing apparatuses. At this stage where the power threshold is still low, the power saving level of printing apparatuses 2 and 3 is low, too. Hence, the standby power consumption is high, resulting in waste of power without access.

In this case, control may be done to make only designated printing apparatus 1 stand by at the power saving level PL1 and shift temporary printing apparatuses 2 and 3 to a higher energy saving mode in accordance with the energy saving mode shift time table 1701. The power saving level 1604 of the power control condition table 1601 does not always indicate a fixed power saving level but indicates a designated power saving level at the time of initial activation and upon completion of processing. Control may be done to fix the power saving level, as a matter of course.

The above-described power control condition table 1601 is created by the PM 204 based on the performance tables 901 and 904, the basic power tables 902 and 905, and the power control determination table 1501 of each printing apparatus. The power and service details of each printing apparatus are controlled in accordance with the power threshold based on the power control condition table 1601.

At the stage the power threshold is low, the position convenience (grouping), the convenience of print process time (time shortening using a low energy saving mode or a temporary printing apparatus), and the convenience of usable functions for the user are prioritized over power saving control. However, as the power threshold becomes higher, that is, as the power consumption approaches the monthly target power consumption Pm, control shifts to prioritize power saving while sacrificing the service convenience for the user.

As the control items of the power control condition table 1601, the number of power thresholds, the PM designation, the user selectable, the power saving level, and constraints 1 to 3 have been exemplified. However, the items are not limited to those. The number of power thresholds or power saving levels can be decided based on the control conditions corresponding to them, and vice versa. Alternatively, they may be decided independently. That is, the above-described creation algorithm of the power control condition table 1601 is merely an example, and the present invention is not limited to this.

Figure 18:
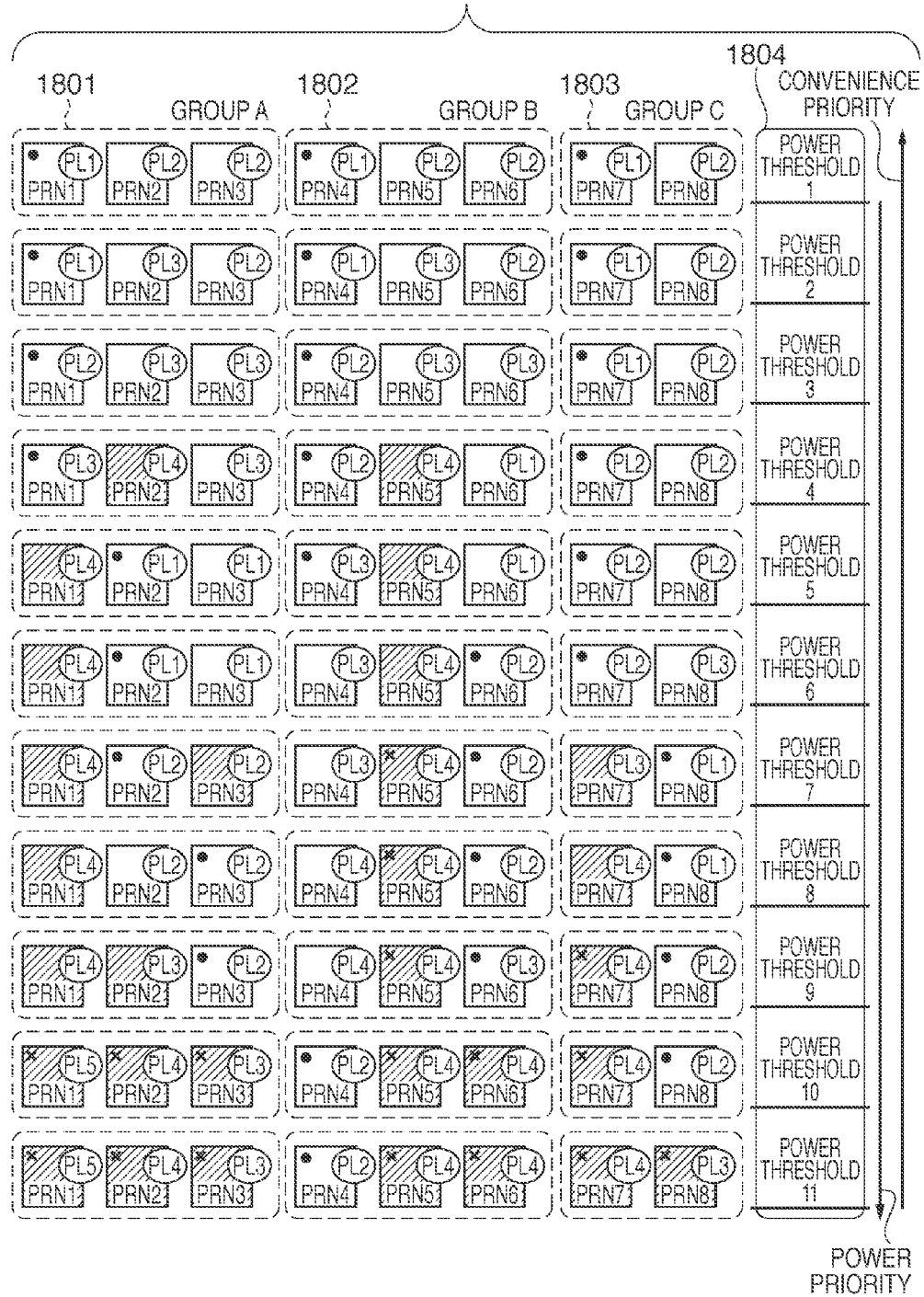
FIG. 18 is a view showing the power control state of the printing system based on the power control condition table.

FIG. 18 illustrates a state in which the eight printing apparatuses PRN1 to PRN8 controlled based on the power control condition table 1601 are controlled in accordance with the levels of power thresholds 1 to 11. Symbols in FIG. 18 will be explained first. Each bold line rectangle represents a printing apparatus. A hollow rectangle represents a printing apparatus selectable by the user, and a hatched rectangle represents a printing apparatus unselectable by the user. PL1 to PL5 added to the rectangles represent power saving levels. A symbol "●" indicates a designated printing apparatus, and a symbol "x" indicates that the printing apparatus is unusable as a temporary printing apparatus. Note that the printing apparatuses other than those given "x" always have the possibility of being used as a temporary printing apparatus.

Based on the example of the certain floor described with reference to FIG. 4, a column 1801 indicates the group A (printing apparatuses PRN1 to PRN3), a column 1802 indicates the group B (PRN4 to PRN6), and a column 1803 indicates the group C (PRN7 and PRN8). Each group is indicated by a broken line rectangle. A column 1804 indicates the levels of power thresholds 1 to 11.

As is apparent from comparison between the power control determination table 1501 and the power control condition table 1601, as the power threshold lowers, a more advanced printing apparatus is selected as the designated printing apparatus, and the number of types of printing apparatuses freely selectable by the user increases. At the same time, the power saving level is also low so that the printing apparatus is set to be able to immediately react to a user's print request. That is, control is performed to prioritize the convenience for the user at low power thresholds 1 to 6.

Reversely, as the power threshold rises, a printing apparatus with low power consumption is selected as the designated printing apparatus, and the number of printing apparatuses selectable by the user gradually decreases. In addition, the power consumption is controlled to always set a high power saving level. That is, control shifts to prioritize the power while sacrificing the convenience for the user at the high power thresholds (power thresholds 7 to 11).

This means that each group includes a designated printing apparatus when the grouping effectively functions. As is apparent, the grouping control effectively functions up to power threshold 9 but breaks down for power thresholds 10 and 11. For example, only the PRN4 and PRN8 operate for power threshold 10. For power threshold 11, only the PRN4 operates on the entire certain floor in FIG. 4.

Note that the printing apparatuses PRN4 and PRN8 selected after the grouping has broken down are those set by the final selection order 1505 in the power control determination table 1501. According to the order of the final selection order 1505, the printing apparatus that remains for power threshold 11 at the final stage is the PRN4. Comparison between the group B and the remaining groups A and C proves that the PRN5 is never the designated printing apparatus in the group B.

When the Power level 1502 and the Spec level 1503 of the power control determination table 1501 in FIG. 15 are represented by a set (x,y), PRN5=(6,3). That is, the functional performance is low relative to the high power consumption. Hence, a printing apparatus like the PRN5 is never selected as the designated printing apparatus, and is usable only when selected by the user or by the PM 204 as the temporary printing apparatus.

An example will be described in which control of the designated printing apparatus and the temporary printing apparatus is performed in two cases of the low power threshold state (power thresholds 1 to 6) and high power threshold state (power threshold 11) under the power control situation in FIG. 18.

Figure 19:
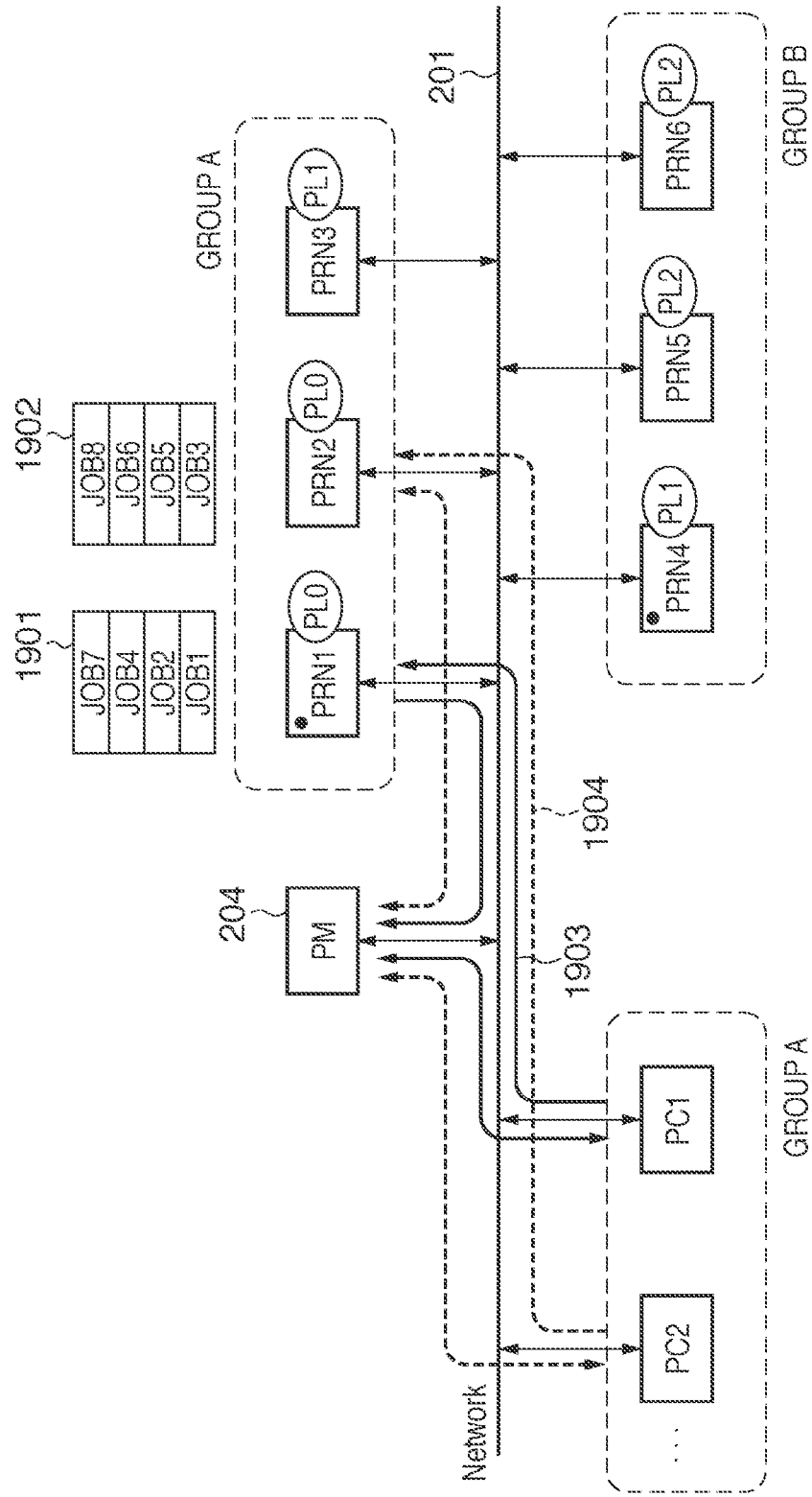
FIG. 19 is a view showing an example of use of a temporary printing apparatus.

FIG. 19 shows an example of use of the temporary printing apparatus.

Here is assumed a scene where heavy print jobs 1901 concentrate to the designated printing apparatus PRN1. In this scene, when a low power threshold is selected (first power threshold), the PM 204 executes control to distribute print jobs 1902 to the temporary printing apparatus PRN2 as well in consideration of the servability of print process time shortening for the user.

The sequence in processing between the PCs and the PRN1 and PRN2 of the group A is indicated by a solid line 1903 and a broken line 1904. The procedure of the sequence is the same as that described with reference to FIG. 2, and a description thereof will not be repeated. The PRN2 serving as the temporary printing apparatus is controlled to shift to the power saving level corresponding to the current power threshold again after completion of processing of the print jobs 1902.

When a high power threshold is selected, the temporary printing apparatus is not used, unlike the above-described case, because power saving is prioritized over the user convenience, as a matter of course. However, the temporary printing apparatus may temporarily be used when the current designated printing apparatus cannot satisfy the print request conditions or a trouble such as a failure or paper jam has occurred.

Figure 20:
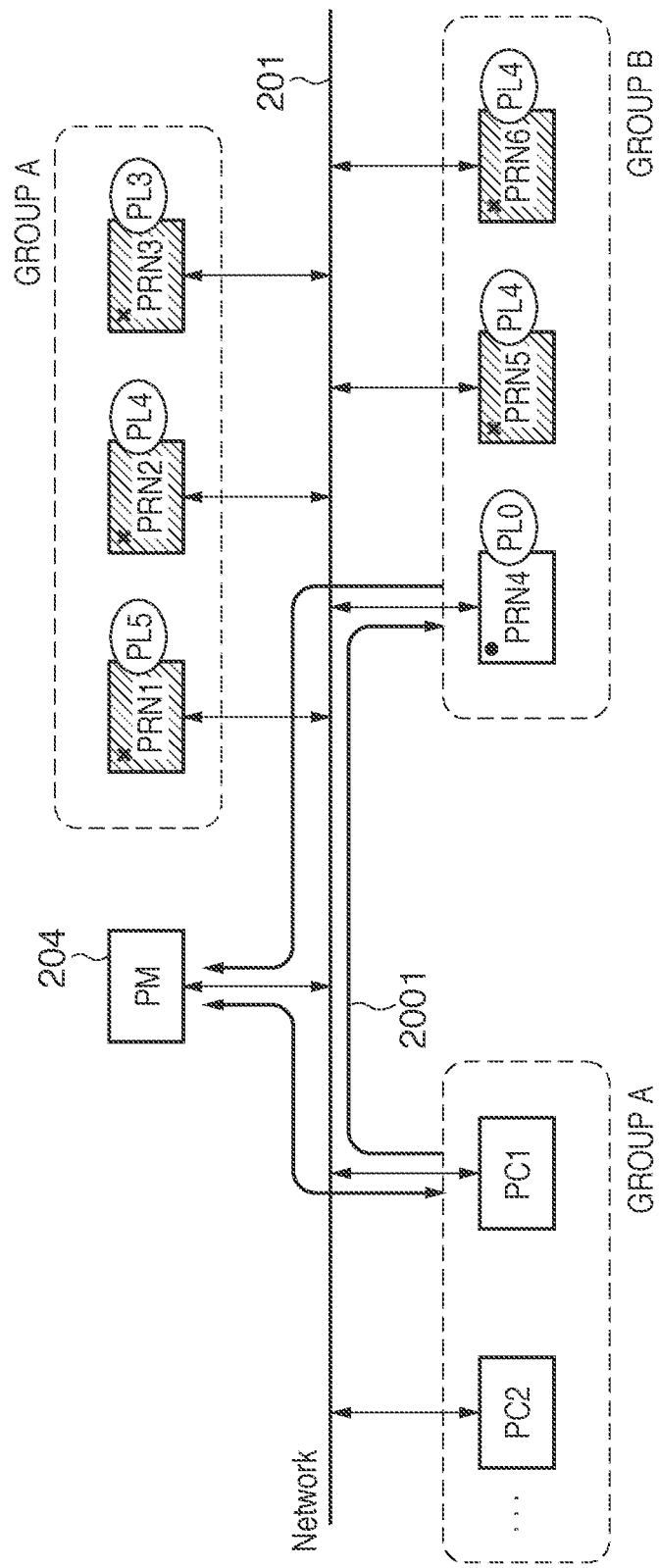
FIG. 20 is a view showing an example in which grouping control breaks down.

FIG. 20 shows a print processing sequence 2001 for power threshold 11 in FIG. 18. The procedure of the print processing sequence 2001 is the same as that described with reference to FIG. 2, and a description thereof will not be repeated. For power threshold 11, only the PRN4 operates on the entire floor, as described above. At this time, all the PRN1 to PRN3 of the group A are unusable. Hence, even when a print request is issued by the PC1 of the group A, the PM 204 selects the printing apparatus PRN4 of the group B. That is, in this case, grouping control is abandoned, and the position convenience for the user is lost.

As described above, a plurality of printing apparatuses on a floor are uniquely categorized using the power thresholds, the device selection pattern, the power control pattern, and the service condition pattern on the power control condition table, thereby executing power control for the target power consumption.

Second Embodiment

Figure 21:
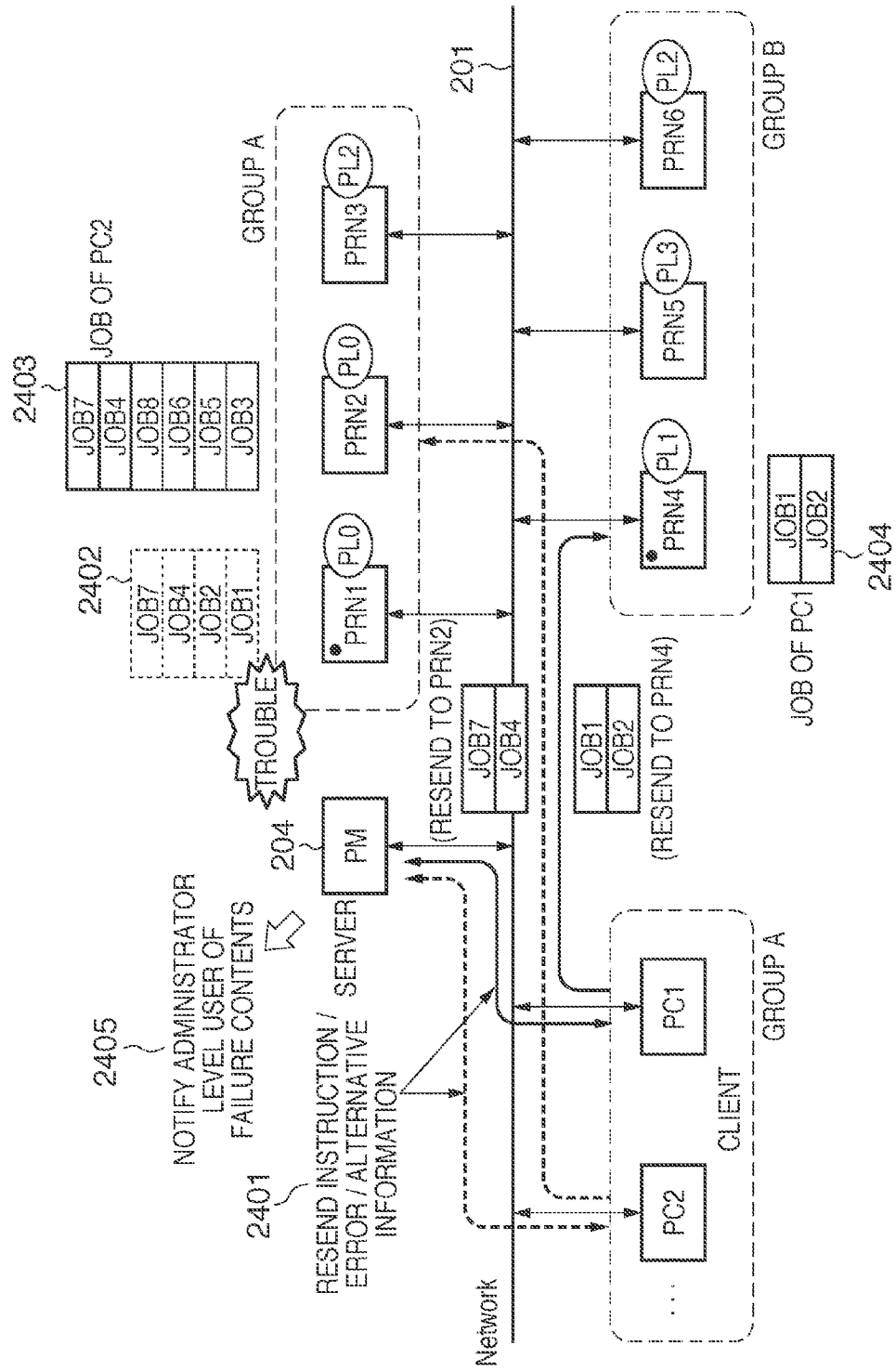
FIG. 21 is a view showing alternative processing in case of a failure in a selected printing apparatus.

In the second embodiment, processing to be performed by the power control system described in the first embodiment when a failure has occurred will be described. FIG. 21 is a view showing processing of dealing with a failure in the selected printing apparatus. Here is assumed a case in which a failure has occurred in a printing apparatus PRN1 designated by a PM 204 for print requests from a PC1 and a PC2.

Examples of the failure are a jam error such as paper jam, an expendable error such as paper-out or toner exchange, and a fault. Upon detecting the failure in the PRN1, the PM 204 analyzes the current power control state and print job contents 2402 and selects an optimum alternative printing apparatus corresponding to the power threshold.

In FIG. 21, an PRN2 that belongs to the same group A and is already processing as the alternative printing apparatus and an PRN4 that belongs to a group B and serves as the current designated printing apparatus are selected. In this case, the position convenience and the convenience of print process time for the print requesting user are taken into consideration, in view of the power threshold.

The PM 204 cancels the print job contents 2402 of the PRN1 and transmits the error details and information of selected alternative printing apparatus to the PC1 and the PC2 as the print request sources, thereby sending a print job resend instruction 2401. The print manager (client) of each request source that has received the resend instruction resends the print jobs to the designated alternative printing apparatus.

The PC1 resends a print job 2404 to the alternative printing apparatus PRN4, whereas the PC2 resends a print job 2403 to the alternative printing apparatus PRN2. Print processing and calculation of power consumption therefor in each alternative printing apparatus are the same as the already described contents. Assume that the resend instruction contents from the PM 204 represent that, for example, the error is a jam error or an expendable error, and a part of the printing is completed. In this case, continuation page information may be added to the instruction contents so that the alternative printing apparatus could start print processing continued from there. Alternatively, the PM 204 may notify the administer level user of the contents of the failure in the printing apparatus.

The printing apparatus where the failure has occurred is excluded from the printing system by the print manager (server) until removal of the failure. Especially when the printing apparatus with the failure is a designated printing apparatus, an alternative designated printing apparatus is necessary.

Figure 22:
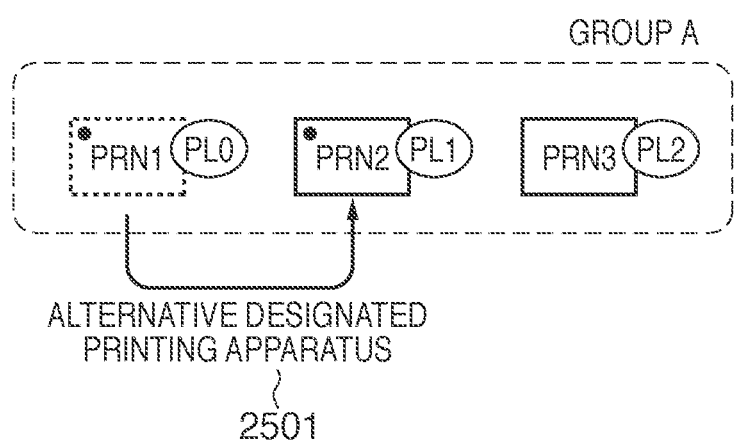
FIG. 22 is a view showing alternative processing in case of a failure in a designated printing apparatus.

FIG. 22 is a view showing selecting an alternative to the designated printing apparatus. The PM 204 excludes the designated printing apparatus PRN1 with the failure, and selects the printing apparatus PRN2 planned to be the next designated printing apparatus on a power control condition table 1601 described with reference to FIG. 16 as an alternative designated printing apparatus 2501.

Although not illustrated here, whether the PRN1 will return to the designated printing apparatus again after removal of the failure is determined based on the power threshold at that point of time. It is possible to determine, based on the power threshold at that point of time and the power control condition table 1601, whether the PRN1 can be the designated printing apparatus.

As described above, in the second embodiment, even when a failure has occurred in the designated printing apparatus of the system under power control, it can be solved by the server PC, which detects the failure and redesignates another printing apparatus for reprinting.

<Procedure of Processing According to First and Second Embodiments>

The print procedure in an example of network-printing will be described next separately from the viewpoint of the print manager client PC (to abbreviated as a "client PC" hereinafter) and the print manager server PM (to abbreviated as a "server PM" hereinafter).

Figure 23:
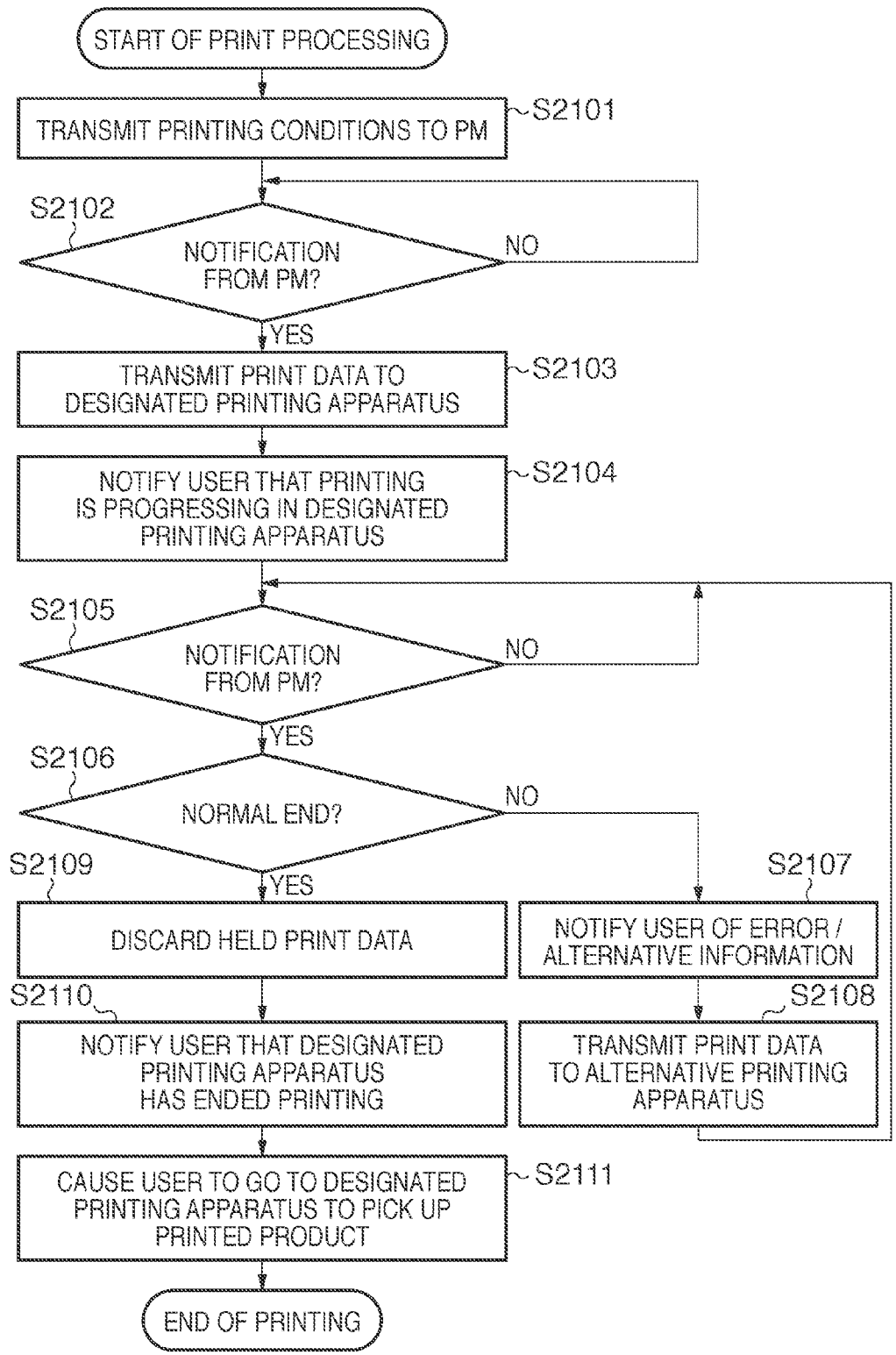
FIG. 23 is a flowchart illustrating a sequence of PC-side processing in network printing.
Figure 24:
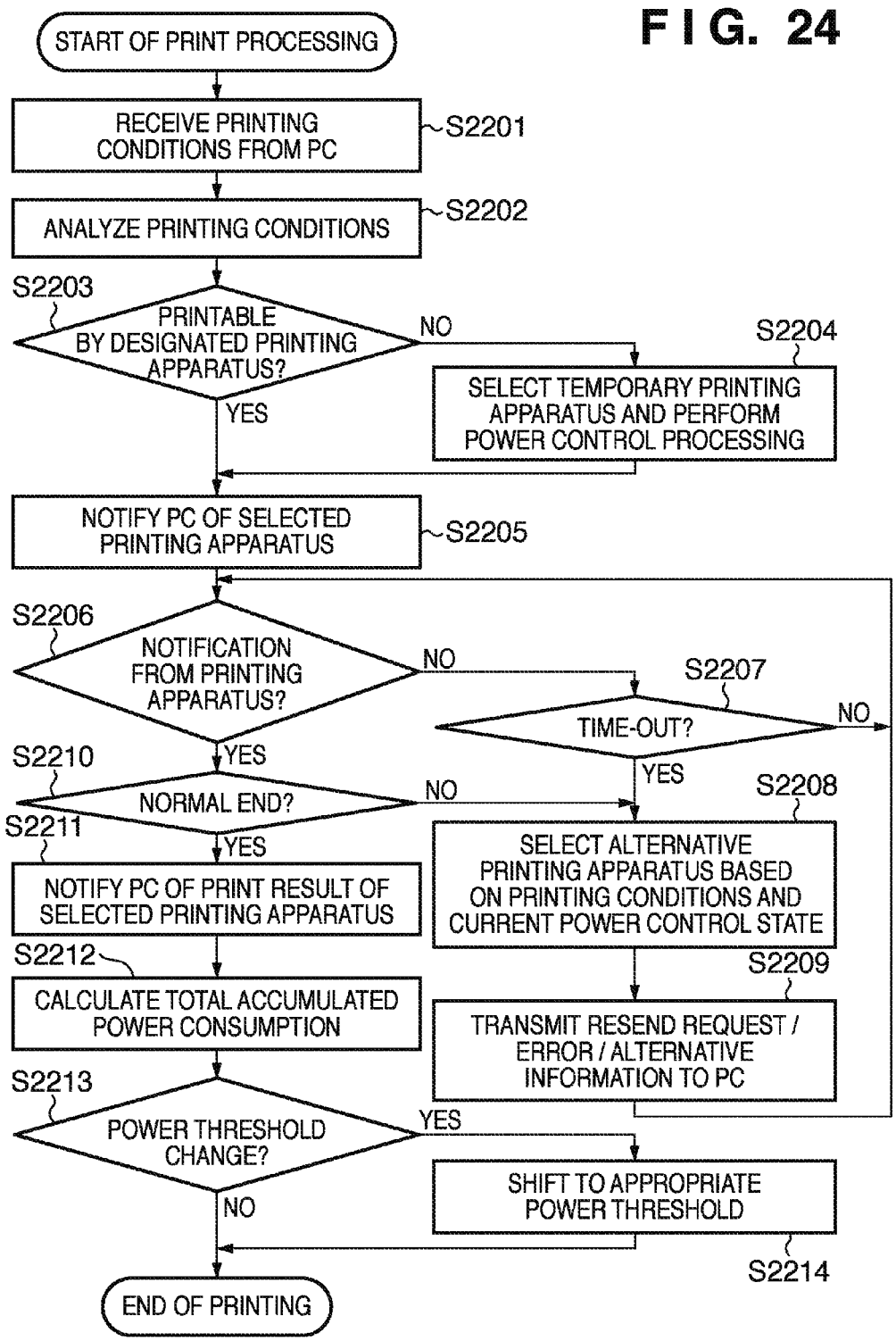
FIG. 24 is a flowchart illustrating a sequence of PM-side processing in network printing.

The procedure of processing according to the second embodiment will be described below with reference to FIGS. 23 and 24. However, those skilled in the art can understand that executing all processes shown in FIGS. 23 and 24 is not always necessary for the present invention. For example, processing according to the first embodiment can be achieved by causing the server PM to execute, for example, steps S2201, S2202, S2205, S2211, S2212, S2213, and S2214 of FIG. 24.

FIG. 23 is a flowchart illustrating the procedure of print processing executed by the client PC. The client PC is the PC1 or PC2 in FIG. 2. In step S2101, the client PC creates the printing conditions of a file to be printed and transmits the conditions to the server PM. In step S2102, the client PC checks whether a transmission result has been received from the server PM. The client PC waits until reception of the transmission result.

Upon receiving the notification from the server PM in step S2102, the client PC transmits print information including the printing conditions and print data to the designated printing apparatus in step S2103. The printing conditions created in step S2101 are sent as parameters to the driver software of the designated printing apparatus. In step S2104, the client PC notifies its user that printing is progressing in the designated printing apparatus. In step S2105, the client PC checks again whether a print processing notification has been received from the server PM, and waits until confirmation of the print processing notification.

If the print processing notification represents an abnormal end in step S2106, the client PC executes error processing in steps S2107 and S2108. In step S2107, the client PC notifies the user of error details and alternative information from the server PM. In step S2108, the client PC resends the print information to the designated alternative printing apparatus in consideration of the error details, for example, instructing print start from the middle. The client PC then waits for the notification from the server PM again in step S2105.

If the print processing notification represents a normal end, the client PC discards the held print data in step S2109. In step S2110, the client PC notifies the user that the designated printing apparatus has ended the print processing. The print data is assumed to be held up to the end of processing in consideration of a failure. At last, in step S2111, the user who has received the print processing notification goes to the designated printing apparatus to pick up the printed product, thus ending the print processing viewed from the client PC.

FIG. 24 is a flowchart illustrating the procedure of print processing executed by the server PM. The server PM is, for example, the PM 204 in FIG. 2. In step S2201, the server PM receives printing conditions from the client PC. In step S2202, the server PM analyzes the received printing conditions. In the analysis processing, the server PM selects an optimum printing apparatus in consideration of the printability of the designated printing apparatus and service details corresponding to the current power threshold (convenience priority and power saving priority).

For example, when power threshold 4 in FIG. 16 is selected (when the total power consumption is equal to or lower than power threshold 4), the PRN1 that is the designated printing apparatus is selected. When power threshold 5 in FIG. 16 is selected (when the total power consumption is higher than power threshold 4), the PRN2 that is the designated printing apparatus is selected. As shown in FIG. 15, the PRN1 has higher performance, although the power consumption is high. Although the power consumption of the PRN2 is lower than that of the PRN1, the performance is also lower than that of the PRN1.

Alternatively, when, for example, power threshold 4 is selected (when the total power consumption is equal to or lower than power threshold 4), as shown in FIG. 16, the user can select the PRN1 or PRN3. On the other hand, when power threshold 5 is selected (when the total power consumption is higher than power threshold 4), the user cannot select the PRN1. Hence, when the user designates the PRN1, and power threshold 4 is selected, the server PM selects the PRN1 designated by the user. However, when power threshold 5 is selected, the server PM does not select the PRN1 designated by the user. In this case, the server PM can select the PRN2 that is the designated printing apparatus.

In step S2203, the server PM determines whether the designated printing apparatus can print. Cases in which printing is impossible include, for example, a case in which the designated printing apparatus is faulty and a case in which the designated printing apparatus still has a print request in queue. Upon determining that the designated printing apparatus cannot print, the server PM selects an optimum temporary printing apparatus and executes power control processing based on the power control condition table 1601 in FIG. 16 in step S2204. More specifically, the temporary printing apparatus corresponding to the selected power threshold is selected. When power threshold 5 is selected, and the PRN2 is faulty, the server PM selects the PRN1 or PRN3. In step S2205, the server PM notifies the client PC of the selected printing apparatus. On the other hand, if the current designated printing apparatus has no problem in step S2203, the server PM notifies the client PC of it as the selected printing apparatus in step S2205. When an optimum temporary printing apparatus is selected, the server PM notifies the client PC of the printing apparatus.

Referring to FIG. 16, when power thresholds 1 to 9 are selected, each of all the PRN1 to PRN3 is designated as the designated printing apparatus or temporary printing apparatus. However, the present invention is not limited to this. For example, when power threshold 7 is selected, the PRN2 may be designated as the designated printing apparatus, whereas the PRN1 and PRN3 may be designated as undesignatable printing apparatuses. In this case, when power threshold 7 is selected, the PRN2 that is the designated printing apparatus is selected even if it cannot immediately print. That is, the PRN2 prints after its trouble such as a fault or paper jam has been removed, or the print request in queue of the PRN2 has been processed. On the other hand, when power threshold 6 is selected, and the PRN2 that is the designated printing apparatus cannot print, the PRN1 or PRN3 that is the temporary printing apparatus can be selected.

After having notified the PC of the selected printing apparatus, the server PM checks in step S2206 whether a print processing notification has been received from the selected printing apparatus. In step S2207, the server PM measures the time until reception of the print processing notification. If the time is equal to or shorter than a predetermined time, the server PM waits. If the time has exceeded the predetermined time, the server PM determines that an error has occurred, and executes error processing in steps S2208 and S2209.

In step S2208, the server PM selects an optimum alternative printing apparatus based on the printing conditions and the current power control state. The current power control state means the currently selected power threshold. The alternative printing apparatus is selected based on the printing conditions and the power control condition table 1601 in FIG. 16.

In step S2209, the server PM transmits the error details (in this case, time-out) and alternative printing apparatus information to the client PC so as to request to resend the print information. Then, the process returns to step S2206 to wait for the print processing result notification from the alternative printing apparatus again. If the print processing result notification from the selected printing apparatus represents an abnormal end in step S2210, the server PM executes the error processing in steps S2208 and S2209, as described above. This error is different from the time-out error in step S2209 in that the error details to be sent in step S2209 is what is sent as the print processing result (for example, a jam error or an expendable error). If the print processing result represents a normal end, the server PM notifies the client PC of the print processing result in step S2211.

In this embodiment, a description has been made assuming that the client PC transmits the print information to the printing apparatus after the server PM has notified the client PC of the selected printing apparatus in step S2205. However, for more reliable handling, the client PC and the server PM may exchange information representing that the print information has been transmitted to the selected printing apparatus. In addition, when executing the error processing in steps S2207 and S2208, the server PM may confirm the error details by acquiring the status information of the printing apparatus.

Next, in step S2212, the server PM calculates the total accumulated power consumption of the printing system based on the printing result from the selected printing apparatus. This embodiment assumes that the accumulated power consumption or total accumulated power consumption required for the print action of the selected printing apparatus is calculated or measured on the printing apparatus side. However, as described with reference to FIGS. 11A to 11C, power consumption calculation of each printing apparatus can be executed by either of the server PM and the printing apparatus. The printing system indicates all printing apparatuses under power control by the server PM.

In step S2213, the total power consumption of the printing system is compared with the current power threshold. If the power consumption exceeds the power threshold as the result of comparison, the server PM performs shift to an appropriate power threshold in step S2214. This means that one of the power thresholds other than the first power threshold selected first for the power control and closer to Pm is selected as the second power threshold. If the power consumption does not exceed the power threshold, the current power control state is maintained. The shift processing to an appropriate power threshold is power control based on the power control condition table 1601 in FIG. 16 and does not always ensure sequential transition to the power threshold of next level. For example, when mass print processing is executed, the power threshold may jump to a power threshold higher by several levels at once. The print processing viewed from the server PM thus ends. Normally, the minimum power threshold equal to or higher than the total power consumption is selected from the plurality of power thresholds. The server PM executes power control of each printing apparatus in the above-described way in accordance with the selected power threshold. More specifically, the server PM controls each printing apparatus to the power saving level associated with the power threshold as shown in FIG. 16. For example, when power threshold 4 is selected (when the total power consumption is equal to or lower than power threshold 4), as shown in FIG. 16, the power saving level of the PRN2 is set to PL4. When power threshold 5 is selected (when the total power consumption is higher than power threshold 4), the power saving level of the PRN2 is set to PL1. As described above, the power consumption of the PRN 2 in the standby state is lower at PL4 than at PL1.

Third Embodiment

Figure 25:
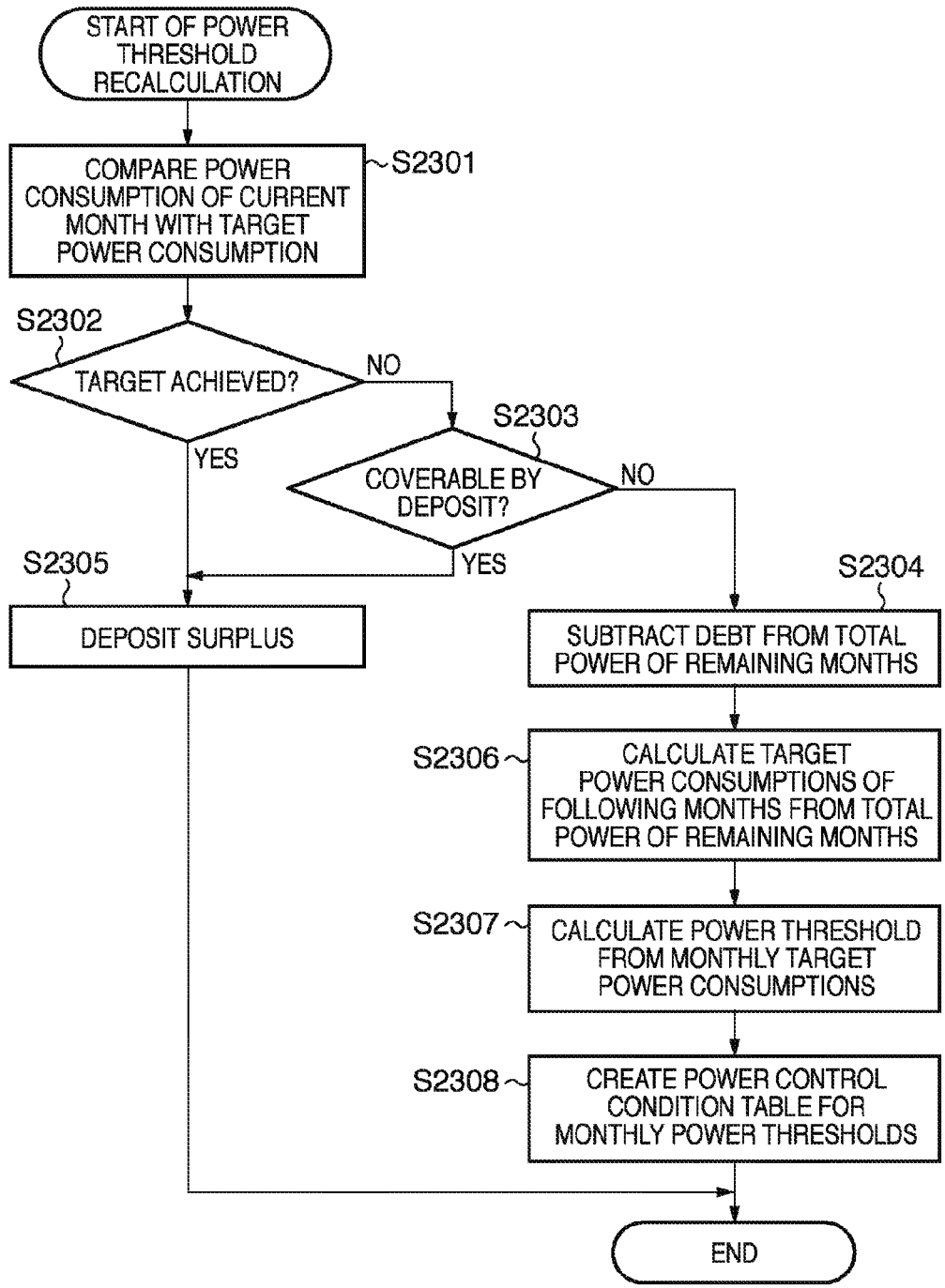
FIG. 25 is a flowchart illustrating an example of periodical power threshold recalculation.

In the third embodiment, how to time-serially recalculate and update the power threshold set in the power control system of the first embodiment will be described. FIG. 25 illustrates an example of a procedure concerning power threshold recalculation executed by, for example, a server PM 204 in FIG. 2.

In step S2301, a power consumption required in the current month is compared with a monthly target power consumption Pm after the elapse of the month. In step S2302, the server PM determines whether the power consumption is higher than the target power consumption. If the power consumption is equal to or lower than the target power consumption, that is, if the target power consumption has been achieved, the server PM records the difference as a deposit in step S2305 and continues the current power control in the next month.

If the power consumption required in the current month is higher than the target power consumption, the server PM determines in step S2303 whether the deposit up to the month earlier can cover the excess (debt). Upon determining that the deposit is equal to or larger than the debt, the server PM records the difference as the deposit again in step S2305 and continues the current power control in the next month.

Upon determining that the deposit is smaller than the debt, the server PM subtracts the difference from the total power of the remaining months in step S2304, that is, the total power of the remaining months will be calculated by subtracting the debt from the sum of the current deposit and the allowable power consumptions of the remaining months. In step S2306, the monthly target power consumptions of the following months are recalculated in accordance with the same procedure as that described with reference to FIG. 12, using the total power of the remaining months updated to the remainder obtained by subtracting the excess. In step S2307, the monthly power thresholds are calculated from the monthly target power consumptions of the following months. Finally in step S2308, the power control condition table 1601 is created from the monthly power thresholds. As described above, the recalculation is performed so that the higher the power consumption required in the current month is, the lower the threshold of the next month is.

In the procedure, the monthly target power consumption has been exemplified. However, an annual, weekly, or daily target power consumption may be used, as a matter of course. In this embodiment, the description has been made by way of a deposit/debt system. However, the present invention is not limited to this. As another example, an increase or decrease relative to the target value may be calculated every month, and the monthly target power consumptions of the remaining months may be recalculated every month.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-145526, filed Jun. 25, 2010 and 2011-117445, filed May 25, 2011, which are hereby incorporated by reference herein in their entirety.

What is claimed is:

1. An information processing apparatus that includes a storage unit configured to store an accumulated power consumption, within a predetermined period, of a printing apparatus group including a first printing apparatus and a second printing apparatus whose performance and power consumption upon printing are lower than those of the first printing apparatus, and upon receiving a print request from a client, selects a printing apparatus to execute the requested printing from the printing apparatus group based on the accumulated power consumption, comprising:
    an acquisition unit configured to acquire the print request from the client;
    a selection unit configured to select the first printing apparatus when the accumulated power consumption is not more than a first threshold, and selects the second printing apparatus when the accumulated power consumption is higher than the first threshold; and
    an accumulation unit configured to add a power to be consumed by the printing apparatus selected by said selection unit to process the print request to the accumulated power consumption stored in the storage unit.

2. The apparatus according to claim 1, wherein said accumulation unit refers to a memory that records a power to be consumed by each printing apparatus included in the printing apparatus group to process the print request, thereby obtaining the power to be consumed by the printing apparatus selected by said selection unit to process the print request.

3. The apparatus according to claim 1, further comprising a control unit configured to control the second printing apparatus such that the power consumption in a standby state is smaller when the accumulated power consumption is not more than the first threshold, compared to when the accumulated power consumption is higher than the first threshold.

4. The apparatus according to claim 1, wherein when the print request acquired by said acquisition unit includes information representing a printing apparatus designated by a user, said selection unit is further configured to select the printing apparatus designated by the user if the accumulated power consumption is not more than a second threshold having a value not less than the first threshold, and select the second printing apparatus if the accumulated power consumption is higher than the second threshold.

5. The apparatus according to claim 1, wherein when the accumulated power consumption is not less than the first threshold, and the second printing apparatus cannot print, said selection unit is further configured to change the printing apparatus to be selected to the first printing apparatus.

6. The apparatus according to claim 1, wherein when the print request includes a predetermined print parameter, said selection unit is further configured to select the second printing apparatus if the accumulated power consumption is not more than a second threshold having a value not less than the first threshold, and select no printing apparatus if the accumulated power consumption is higher than the second threshold.

7. The apparatus according to claim 1, further comprising a calculation unit configured to calculate the first threshold such that the first threshold becomes lower when the accumulated power consumption in a period before the predetermined period is higher.

8. A non-transitory storage medium storing a computer program that causes a computer to function as the information processing apparatus of claim 1.

9. An information processing method to be performed by an information processing apparatus that includes a storage unit configured to store an accumulated power consumption, within a predetermined period, of a printing apparatus group including a first printing apparatus and a second printing apparatus whose performance and power consumption upon printing are lower than those of the first printing apparatus, and upon receiving a print request from a client, selects a printing apparatus to execute the requested printing from the printing apparatus group based on the accumulated power consumption, comprising the steps of:
    acquiring the print request from the client;
    selecting the first printing apparatus when the accumulated power consumption is not more than a first threshold, and selecting the second printing apparatus when the accumulated power consumption is higher than the first threshold; and
    adding a power to be consumed by the printing apparatus selected in the selecting step to the accumulated power consumption stored in the storage unit.

* * * * *